United States Patent Office 3,178,130
Patented Apr. 13, 1965

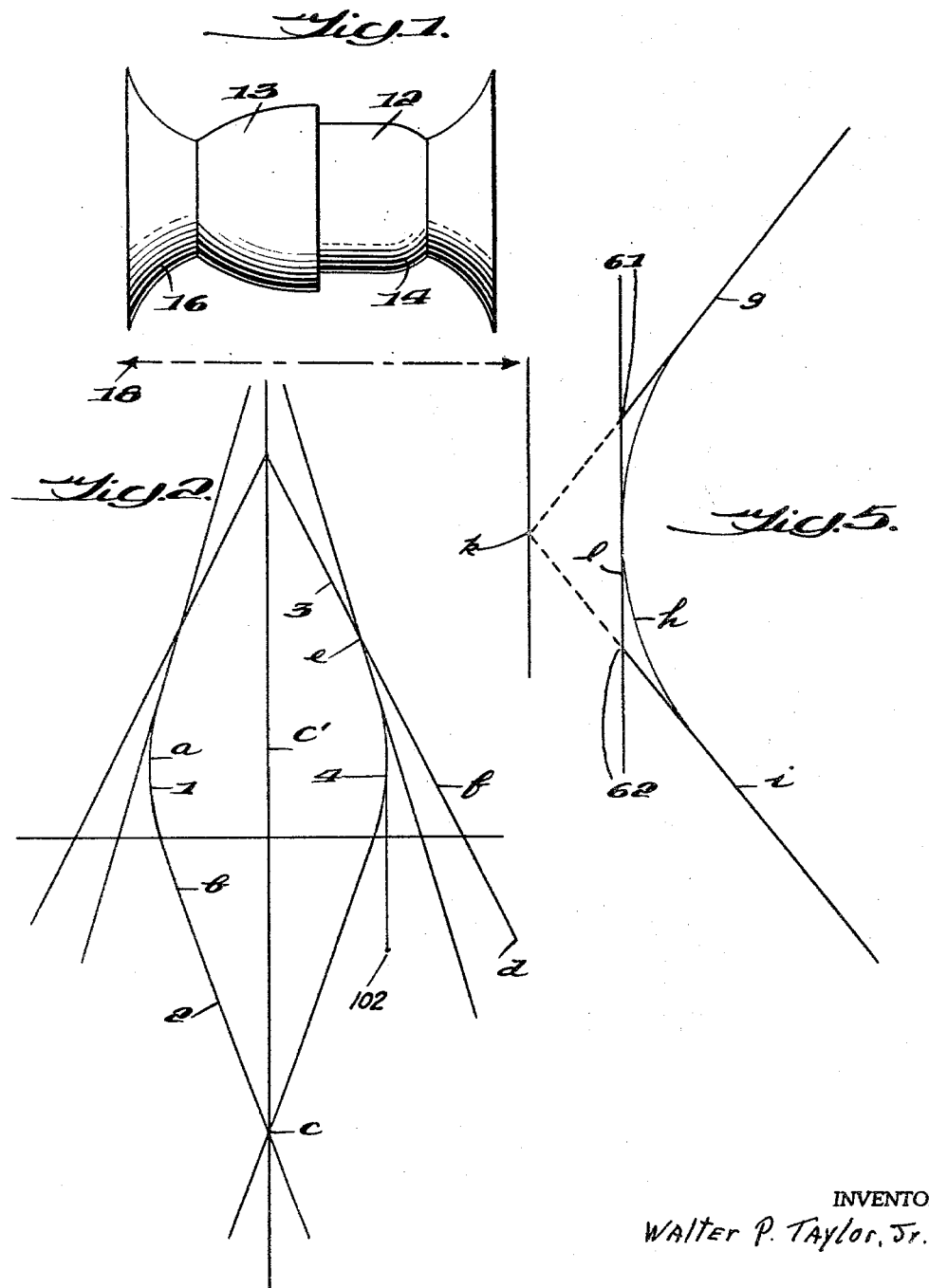

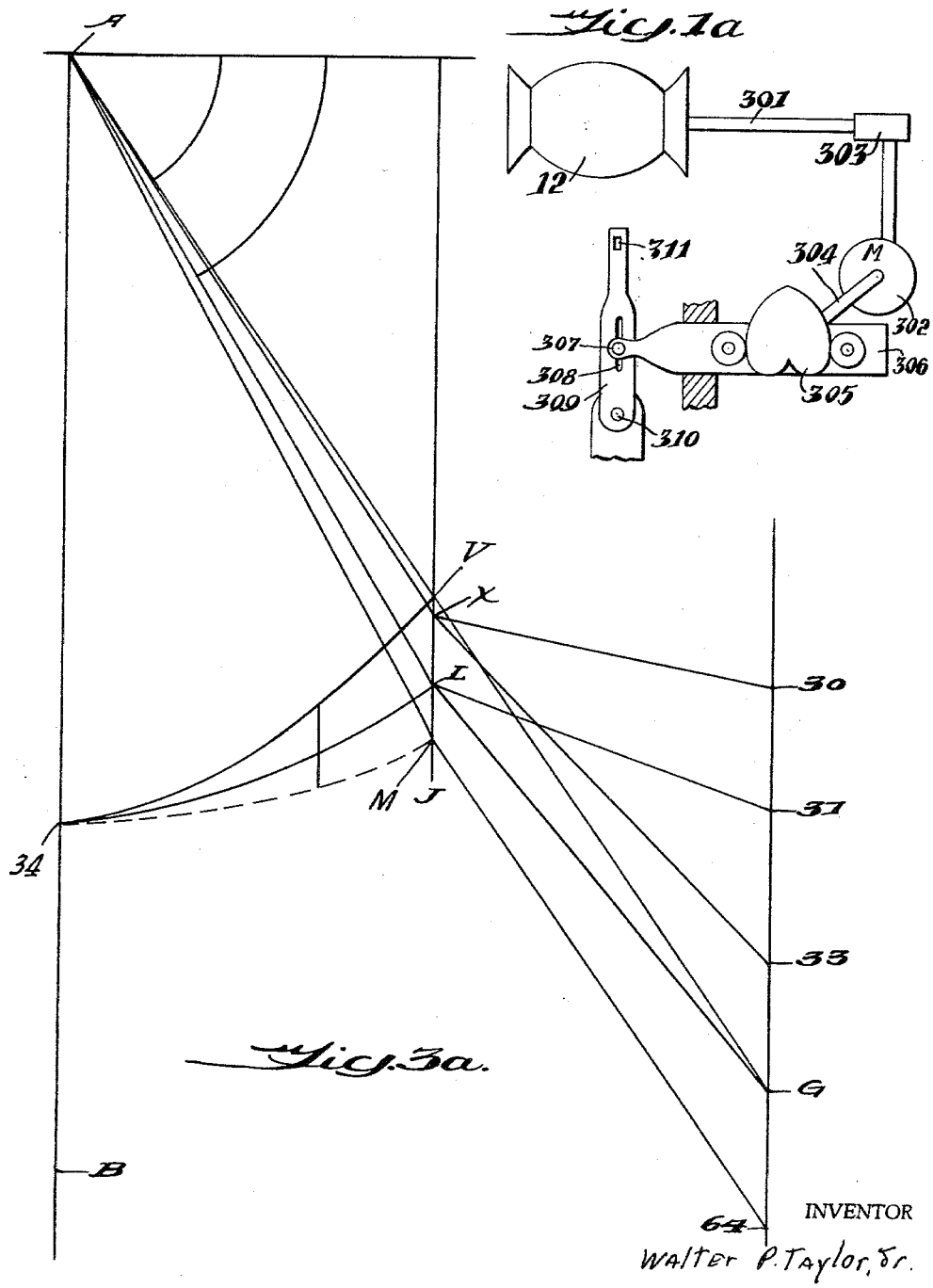

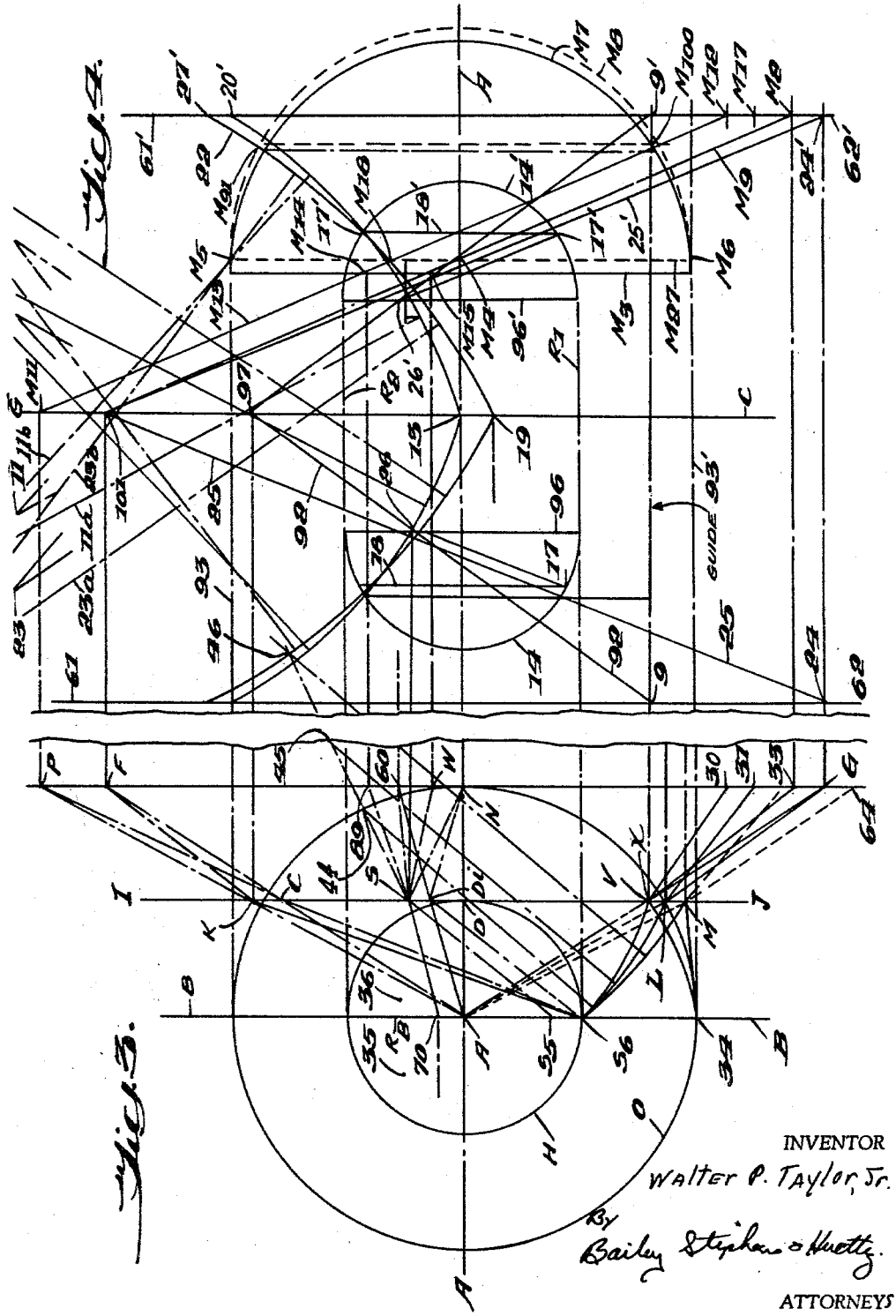

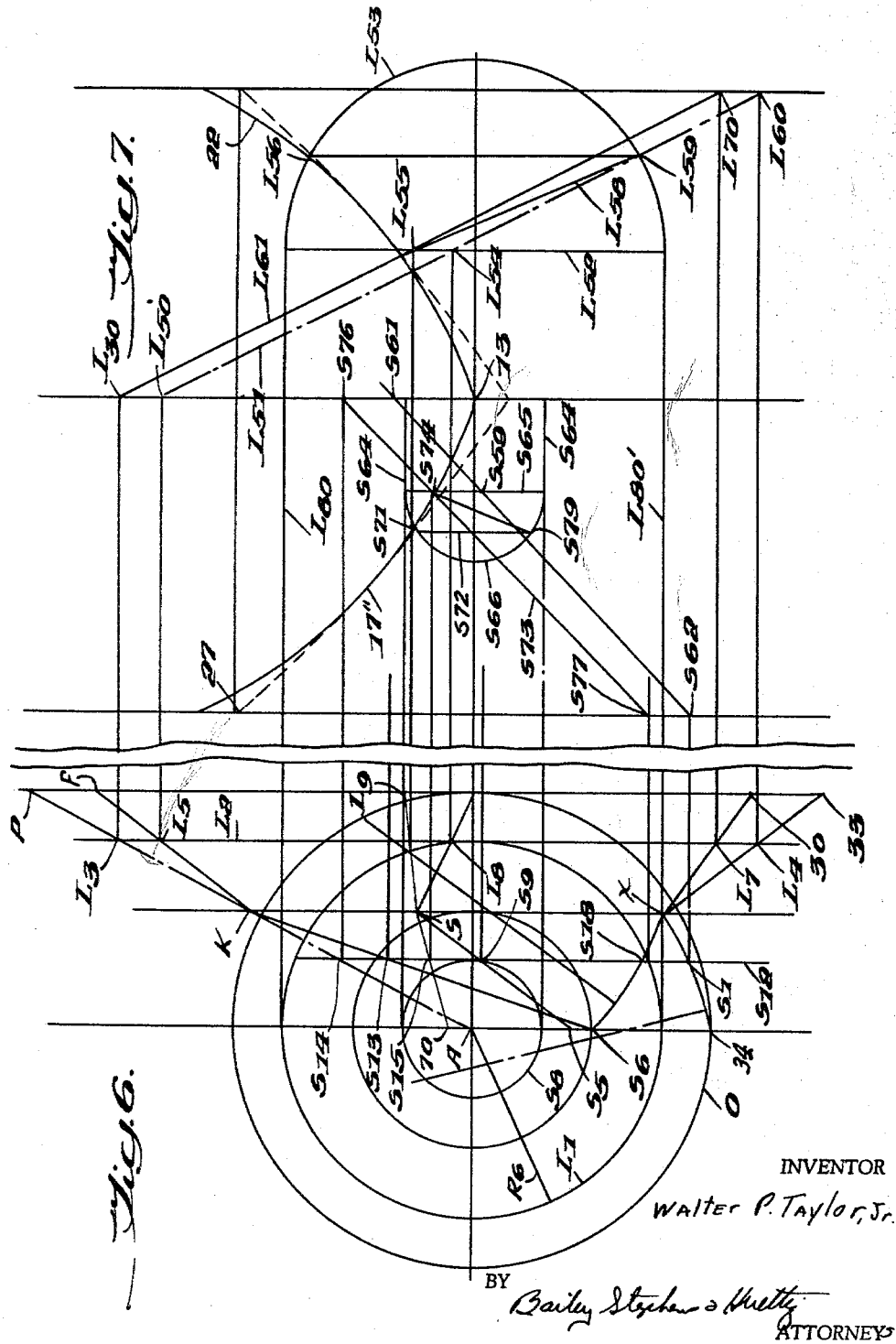

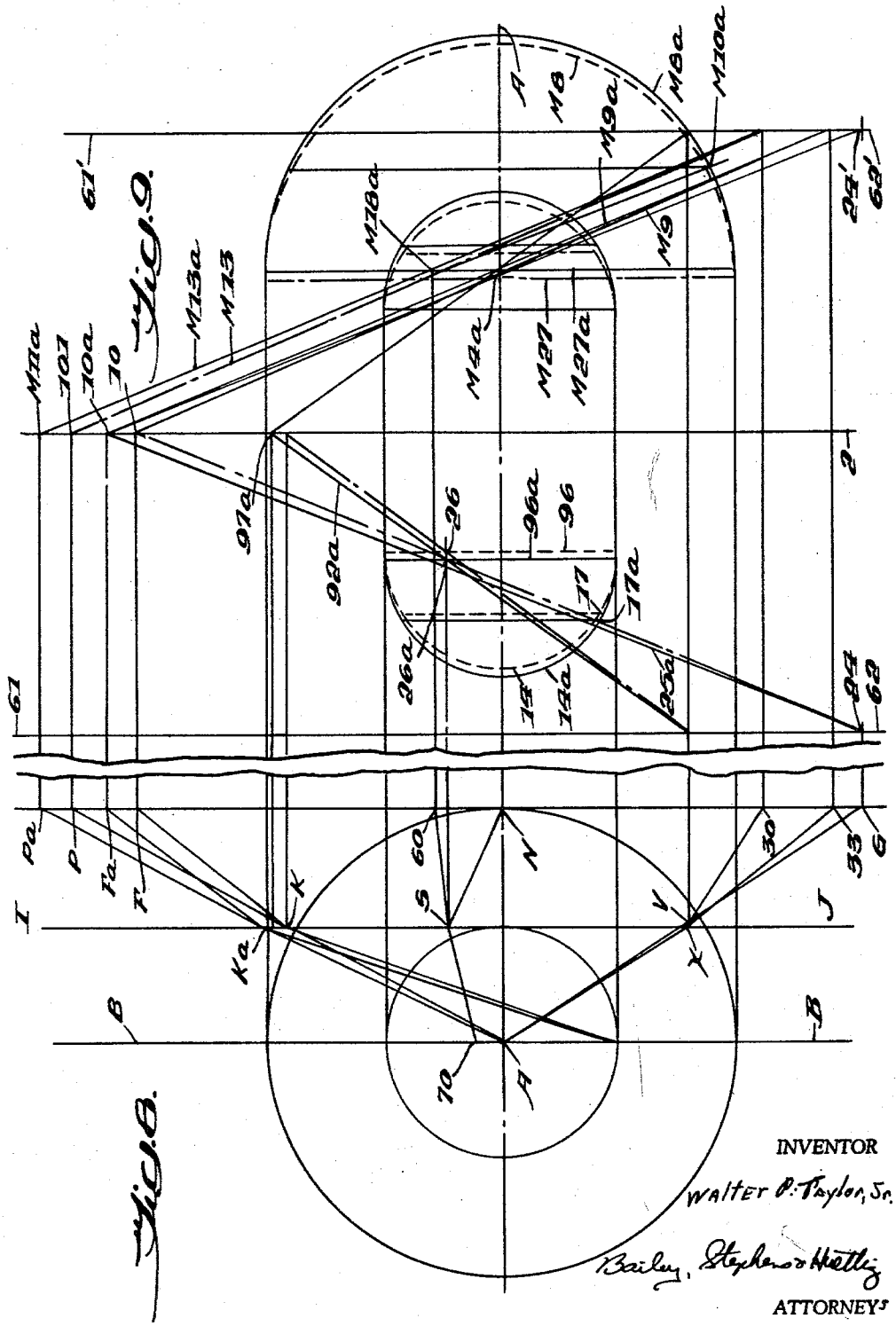

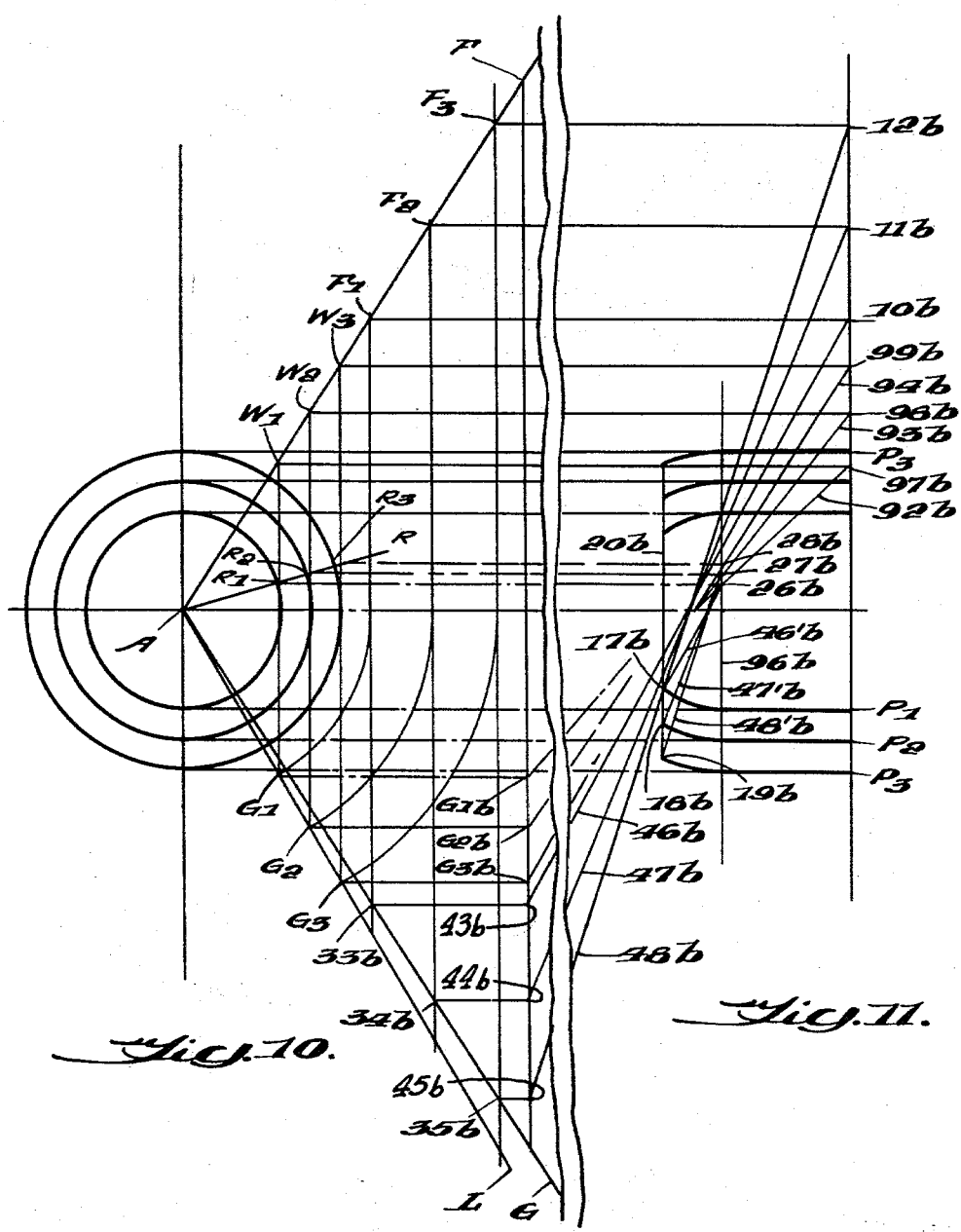

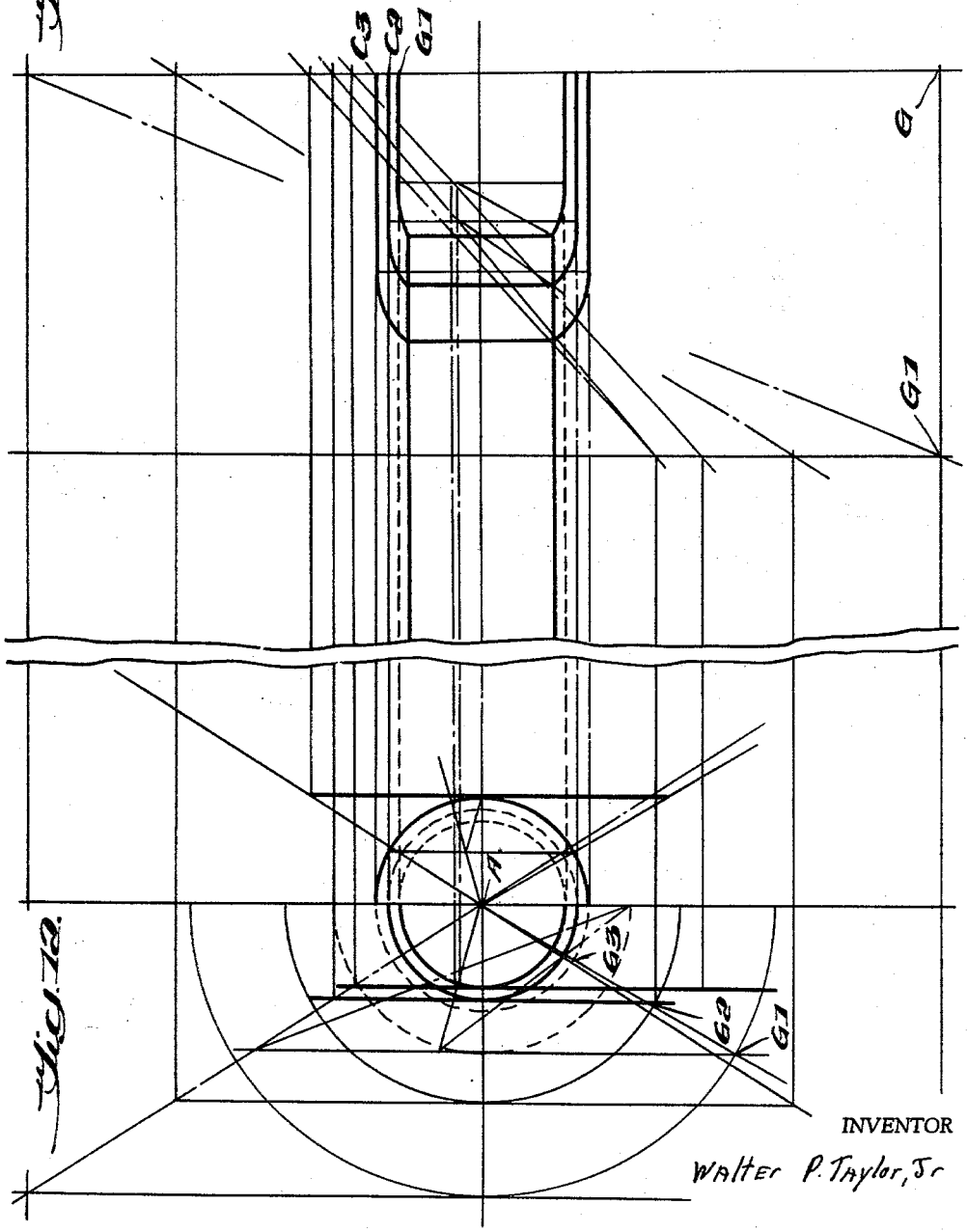

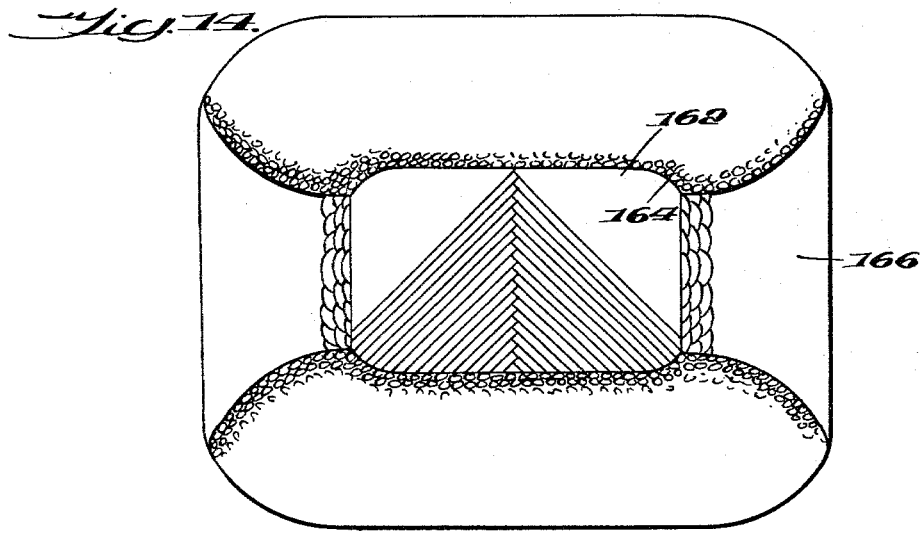
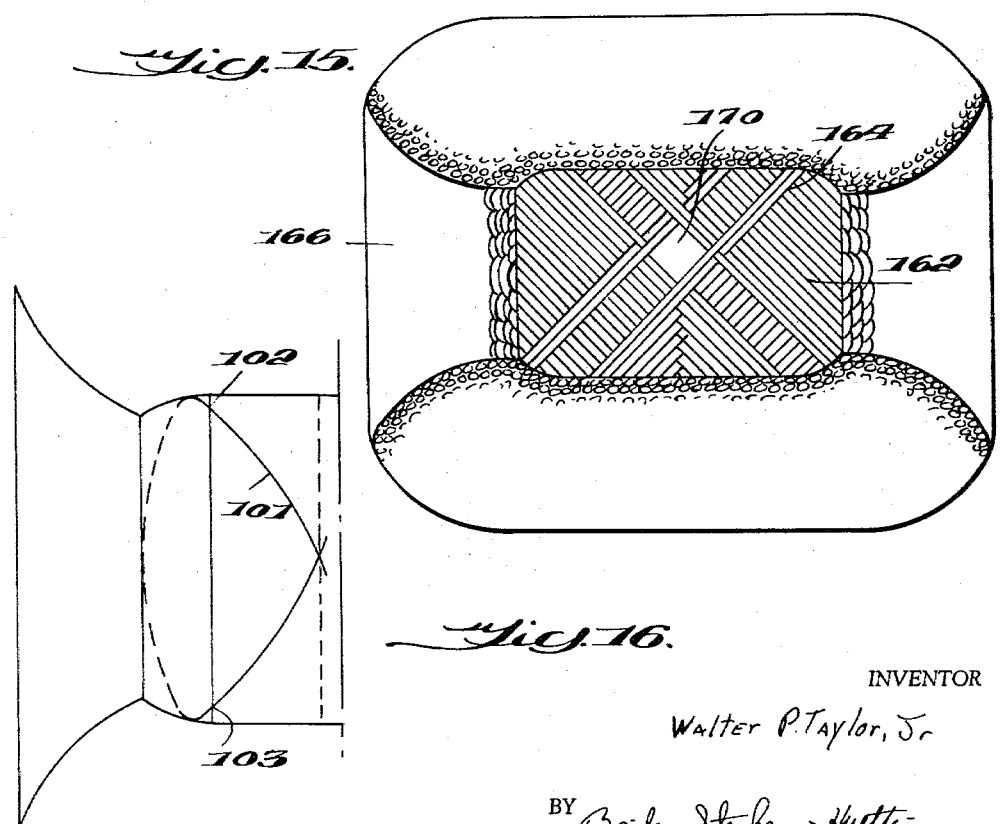

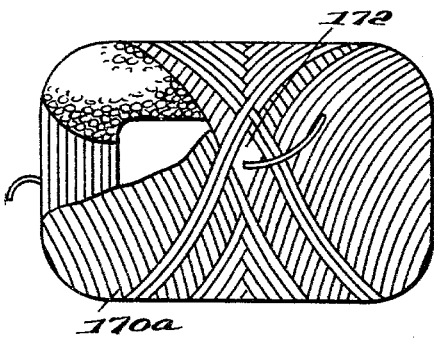
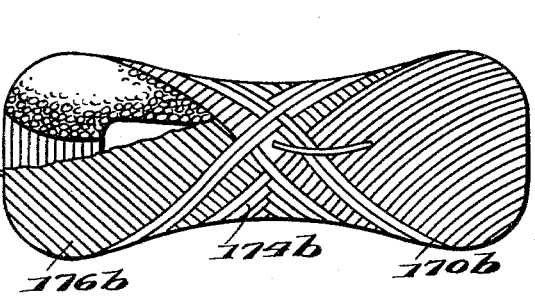
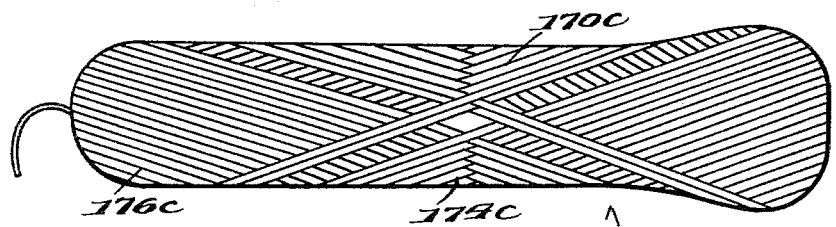
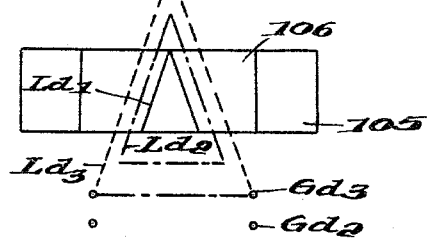
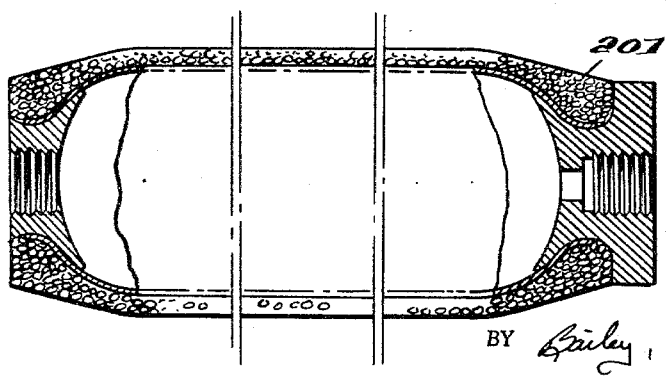

3,178,130
WINDING FLEXIBLE MATERIAL
Walter P. Taylor, Jr., 1530 Archer Road, New York, N.Y.
Filed Oct. 26, 1962, Ser. No. 233,412
7 Claims. (Cl. 242—163)

The invention relates to machines and methods of winding long lengths of flexible materials such as wire, rayon filaments, glass filament, yarn, thread, rope, ribbon, tape, slit plastic sheeting, cable and the like on cops, spools, and mandrels and to methods of modifying and packaging such windings; to the packages so produced; and to the tubes, cops, spools, mandrels, or rotational forms on which such windings are formed. More especially, it relates to the winding, spooling, and forming of any bendable, filamentous or ribbon-like substance, including all cross-sectional shapes of wire or other substance and especially to those with slippery surfaces, with unusual stretch characteristics, or which require minimum surface pressure and/or minimum stretching; and to obtaining improved pay off of such substances.

The primary object of the invention is to produce improved supported and self-supporting coil packages of flexible materials in which the substance can cross over itself at relatively widely spaced radial intervals to avoid destructive bends from the scissors action of close crossovers, can be laid on in helixes which form relatively small angles to the axis so that the line will pay off over the end or through the center with almost no frictional resistance, is reversed at the ends of the package without angular deflection, can be laid on with extremely low tension but without sliding so that the substance will be contained under minimum pressure either on or off a supporting mandrel and so as to avoid collapse if the support is removed and yet remain completely self-supporting so that the line can be withdrawn freely from either the center or the outside from either end, or through a radial hole.

A further object of the invention is to provide a particularly effective shape of spool, cop, or winding mandrel and a machine utilizing such a shape for winding the desired form or package, based on certain machine settings and trigonometric formulas for the shapes, the formulas providing the variations in shape for different angles of wind, orders (or counts) of wind, advances, and rotational forms. Heretofore, successful spool (with flanges) winds have been dependent on trial and error adjustments that have only approximated the conditions disclosed and measured by these new formulas, and also dependent on tension of the winding line and bailing pressure from rollers bearing on the package instead of correct mandrel form and/or correct machine adjustments, and have provided packages which are inferior for the despooler in that the substance, sometimes crushed and embedded into itself, or even cut from the spooling process and the pressures it causes, lies at such wide angles to the axis that the line is abraded and strained in paying off, frequently being damaged, interrupted in its flow, or even broken as it pays off over package ends which are deformed by the angular deflection and consequent slipping of the winding line at these reversal points, or is trapped beneath such deformed ends.

Many synthetic fibers used for yarns and threads have a characteristic commonly known as "memory," a term understood in the art to mean that the substance pulls in, over a considerable time period, the stretch it has accumulated from the various windings to which it has been subjected during initial manufacture and subsequent processing, the strenth of the pull increasing in proportion to the lapse of time. This frequently causes a linear product made of the substance, after having been wound apparently satisfactorily, later to crush its supporting cop, to damage itself through crushing or cutting within the walls of its winding, or to burst itself off its cop. It is an object of this patent to provide a method of winding that will allow reduction to a minimum of the tension and pressure now needed for winding so as to eliminate the troubles described. Another object related to this is the provision of a winding contrived so that it will allow the line to pull in its accumulated stretch while in a wound package either on or off a cop without damaging itself.

Another object is to provide such packages eminently suited for subsequent liquid treatment, such as purification treatment of synthetic yarns and dyeing or sizing of any linear substance in a wound form.

Also, heretofore, completely self-supporting winds in this art have been dependent on the bonding quality or frictional adherence of the wound substance, which has been increased by close lay of adjacent coils (close advance) and high tension on the winding line, two conditions which combine to increase the bonding effect by crimping in the line during winding and holding it in place thereafter under high pressure.

Because many substances lack sufficient bonding quality (are too slippery or too hard-and-round) to be held securely either during the winding or after, and because many are damaged or deformed by the shearing action of adjacent strands in close lay winds, by lengthwise stretch from high tension, by bends and rubbing from being pulled at high tension over the angular structure of the ends of these windings, by bends in the line from the angular deflection in the path of the wind at the ends, or by pressure of strand on strand that is built up in the wall of a long length winding, these completely self-supporting windings have been utilized for only a few substances such as cord and rope and in relatively short lengths. In addition, development has been restricted almost entirely to the "ball of cord" or "one-half wind" type which lacks adaptability to changes in shape and winding angle, is limited in length that can be wound, and has little stability for anything but cordage.

It is an object of this invention to eliminate all of the above difficulties. It provides a self-supporting winding and the mandrel and end form shapes on which it is to be wound, fitted to the specific conditions of any winding machine. In addition, since it can be designed for any size and for any angle of wind, it provides wound packages with the best combination of self-supporting wind characteristics for any substance, for any particular use conditions, and for any package type or dimensions, and provides the mandrel or winding dimensions and the machine settings needed for winding it.

An object of the invention is to provide also a method for designing an improved form, mandrel, spool, or cop for taking up and paying off any bendable substance, particularly flat or tape-like substances which heretofore have proved troublesome and which frequently have required complicated machinery for successful winding on reels or spools of current design. In doing this, it is an object to provide a designing medium and the trigonometric formulas by which windings on forms, cops, spools, or mandrels can be planned for specific uses and, within the broad limits of the system, any angle of wind, any ratio of turns of the spindle to strokes of the guide, and any specific silhouette shape of the wound form or package can be selected, the medium supplying the mandrel or form, shape, the machine settings or actions, and the exact shape of every loop for every diameter throughout the entire winding.

Another object of the invention is to produce variations of the same windings which contain a hole radially through the wall as shown in my patents, No. 2,634,922 and No. 2,634,923 of April 4, 1953; No. 2,716,008 of August 23, 1955; No. 2,738,145 of March 13, 1956; No. 2,767,938 of October 23, 1956; and No. 2,828,092 of March 25, 1958; and yet remain completely self-supporting from beginning to end so that the line can be withdrawn from the inside through the radial hole. For clarification, it should be added here that there is no technical difference between a wind described as being composed of figure 8 loops and a precision wind similarly constructed, the building in of a central hole and pay-out through it being all that is needed to convert every loop of a precision wind into a figure eight loop.

Another object is to provide a method for designing improved ends for any shape of the central part of a form (mandrel or spool), across which it is known that a line being wound will traverse, so that the combination will fit predetermined machine adjustments of reasonable size (or so that correct machine readjustments can be determined for a preferred combination), and so that a complete form, mandrel, or spool can be constructed correctly, and the combination of center and ends will prove windable and will result in either a self-supporting winding or in perfect spooling, or, when impregnated with liquid plastic, in a vessel of maximum strength.

Another object of the invention is to provide a method of designing by which self-supporting end formations, such that the wound substance turns back at the ends around spherical areas and avoids being subjected to angular bends, can be provided for any shape of "regular," as opposed to "random," winding.

Still further object of the invention is to produce variations of the same windings which are contracted or collapsed circumferentially in some part or over all their lengths or are partially or completely flattened circumferentially so that greater control of the line during pay-out is gained.

It is also an object of the invention to produce variations of the same windings which are contracted or collapsed axially. Some of these lose their initial form characteristics yet leave a compact coil package composed of a series of coils each of which is proportioned and positioned so as to maintain its relationship to the other coils and to facilitate an orderly, resistanceless withdrawal in one of the ways specified above. In this case, the winding process is simplified by using a large advance and, although this results in an air-filled pack, the contracting eliminates virtually all of the air spaces. At the same time, it leaves a springy package that offers extreme resistance to damage from shock, vibration, and pressure in all planes.

An additional object of the invention is to produce variations of the type of coil containing a radial hole which are collapsed radially from each side of the hole so as to leave a series of nested figure eight coils which will pay out at extremely high speed, the opposed twists in the paid out line cancelling themselves.

Still another object of the invention is to provide packaging of such coils with regard to their characteristics gained from the above processing so as to protect them during handling and to facilitate withdrawal of the substance with the least resistance and with the minimum possibility of harming the substance during the withdrawal.

This application is a continuation-in-part of my prior application S.N. 678,106, filed August 14, 1957, now Patent No. 3,061,238, which in turn was a continuation-in-part of my application S.N. 344,875, filed March 26, 1953, now Patent No. 2,828,092, which was a continuation-in-part of application S.N. 107,165, filed July 28, 1949, now Patent No. 2,634,922.

In such prior applications, I have described a method of designing improved windings for mandrels, spools, or cops, with or without the radial payout hole of my earlier patents, and have given trigonometric formulas for such windings. However, the methods in general illustrates packages whose internal end portions flared outwardly at an angle to the axis.

In my prior applications, referred to above, I have described certain package shapes in connection with a coil formed of figure 8's and having a radial hole into the central axial hole through which the inner end of the material can be drawn out. I have now found that the principle of these shapes, if the proper relative dimensioning of the parts is observed, is applicable to windings which do not have radial openings, and that improved packages, both with and without such openings, can be produced; also, that the principle on which successful winding of such shapes depends is a system of forming wound ends which can be applied successfully to any type of windings except those which might be considered truly random.

Additional study, discovery, and experiments have now clarified the theories involved and have corrected and broadened the method so that outwardly flared end portions of the wound package can be replaced by flat ends, ends rounded without flare, and other shaped end portions and a system has been discovered that provides a long needed pure, winding form and is truly universal in its adaptations. Also, increased understanding of the various theories regarding the effects from changing (1) the width of guide stroke, (2) the ratio of turns of spindle to reciprocations of guide (changing the advance and count), and/or (3) the guide distance from the axis now allows integrating them so as to utilize such simple mechanically controlled variations in first building up, from the wound substance itself, the preferred form or shape on a simple cylindrical shaft and then continuing winding the substance around such a form, the preferred form utilizing to the greatest possible extent the natural spring and torque characteristics of the substance toward self-support and it being demonstrable that self-supporting outer layers of the shape to be described, by their enclosing nature, provide adequate support for the inner form-building portion. It is an object to provide formulation for such machine variations and a method for winding linear substance into such a form.

It is a particular object of the invention to provide a coil or package formed of layers each composed of figure 8 (or multiple figure 8) windings, in which the outer or end parts of the bights of the windings, at least in a substantial proportion of the layers of the package, follow a path which is substantially that of a line on the surface of a sphere, and has an extent of at least 180°, and preferably somewhat more, around the sphere. This clearly prevents collapse of the winding inwardly, since such collapse would require extension of the material to a greater length to pass over the bulge of the sphere. It also proves to prevent outward collapse, perhaps because of the tension exerted on the spherical section by the remaining helical section of the wind.

This result can be obtained either by starting with a mandrel or form of special shape, designed as set forth below, or by building up a form having such characteristics of the inner layers and then winding on these inner layers, in a manner also to be described.

As used herein, "count" designates the number of figure 8's formed on each reciprocation of the guide with respect to the spindle in one direction (if the guide reciprocates once in one direction for one rotation of the spindle, a single figure 8 results and this is a "one" wind). "Advance" (positive or negative) is the angular displacement (in degrees or in angular extent) between the crossovers of successive windings, obtained by having the spindle and guide operating slightly out of phase with each other.

In every cam-operated machine, there is a lag or dwell at the end of each stroke of the guide, produced by the play which always exists. I have found that this dwell must be taken into account in designing a mandrel, and its angular extent, which varies from one machine to another but can be determined for any machine, is of importance.

Further objects and advantages of the invention will appear more fully from the following description, especially when taken in conjunction with the accompanying drawings which form a part thereof.

In the drawings:

FIG. 1 shows diagrammatically a machine embodying the invention;

FIG. 1a shows diagrammatically a machine for winding equipped with a spindle according to the invention.

FIG. 2 shows a typical rubbing, and the manner in which it is interpreted.

FIG. 3 shows the endwise view of the way of designing a mandrel for a "one" wind with no advance;

FIG. 3A is an enlargement of a part of FIG. 2;

FIG. 4 is a sidewise view of FIG. 3;

FIG. 5 is an explanation of the "lag" factor;

FIG. 6 shows in end view the design of mandrels for major and minor stages;

FIG. 7 is a side view thereof;

FIGS. 8 and 9 are an end view and a side view showing the design of a mandrel for an advancing wind;

FIGS. 10 and 11 are diagrams showing the winding of a package with flat ends;

FIGS. 12 and 13 show the winding of a package with inwardly turned ends;

FIGS. 14 and 15 show packages produced according to the invention;

FIG. 16 shows the material extending over more than 180° around the spherical end;

FIGS. 17A, 17B and 17C show a wind before and after collapsing;

FIG. 18 shows how such a package can be wound on a cylindrical spindle;

FIG. 19 shows a resin-impregnated pressure vessel.

FIGURE 1 shows diagrammatically a basic form of machine for winding flexible material embodying the invention. Such a machine, according to the invention, includes a spindle having a central portion which is cylindrical (12) or which is curved (13), end portions 14 which are spherical, and may possibly have end forms 16 beyond the spheres; and a guide 18 for the flexible material, which generally moves parallel to the spindle axis. The cylindrical portion 12 is for use with the constant velocity type of guide motion which is usual on such machines. The curved central portion 13 fits the mandrel to the crank, or constant acceleration, motion which this system makes it possible to utilize. It is undersood on such a machine that there are means for varying (1) the ratio of the turns of the spindle to the reciprocations of the guide, (2) the width of the stroke of the guide, (3) the distance of the guide from the axis of rotation of the spindle, each being linked to and controlled by the number of rotations of the spindle or reciprocations of the guide, or a meter which measures and reacts to different lengths of the substance being wound.

This diagram is based on a small advance either plus or minus, or a combination of the two as shown in my Patent No. 2,767,938, and a "one" wind, that is, a wind in which the spindle makes two complete revolutions, plus or minus the advance factor, for each complete reciprocation of the guide.

If the usual flat sided mandrel, cylindrical or coned, is used to replace the shaped mandrel on such a machine, it will be found that, except for the narrowest of winds, those made by very short guide strokes and which wind a line almost vertical to the axis, any line being wound has a tendency to slip at the ends when the guide reverses its direction of throw, especially if the guide is reciprocating in a plane withdrawn from the face of the mandrel. Heretofore, this simple phenomenon has been impossible to overcome on a practicable, large range basis and has caused most of the restrictions and troubles mentioned above.

Continued experiments soon show that a reduction in diameter of the mandrel ends which means a decreased radius of the mandrel in the reversing area of the wound line is helpful, but also that the rate of decrease, the point of its beginning, and the relation of both to the width of guide stroke and distance of guide from axis are substantially critical for the diameter and ratio being wound. They also show that, although an adjustment that is effective over a small range (a limited number of layers) can be achieved by trial and error, it is usually more costly or frustrating than no success since it leads to failure after some layers have been wound but before sufficient winding for the end in view has been completed.

This new method starts with the design and formulas for off-the-face windings since they appear to be rudimentary to the art, develops them for all angles of wind and sizes and types of bendable substance, and ends with formulas for the guide working on-the-face, utilizing the fundamental designing method for creating a variety of contour shapes which are advantageous for special situations. It proves its value by providing the utmost stability of the wound package for any substance, either supported or self-supporting (with the mandrel withdrawn) and by allowing winding, at practically zero tension, without slippage of the wound substance from beginning to end of the winding and by avoiding the usual greater density at the end turn-around areas which occurs in ordinary universal winds and which retards penetration of liquid into the package.

The correct winding theory is shown in FIG. 2, in which the lag of the guide (due to irregularity and wear of the cam, looseness of the linkage that powers the guide, etc.) is taken into account more accurately, a start toward the theory that there is a revolving shape of changing radii that will wind perfectly—without sideways slipping—a line from a guide which, within definable limits of the art, has changing acceleration, ratio, distance from the axis, and/or width of reciprocation.

It is based on the formations actually made by lines wound on cylindrical and shape-end mandrels so treated as to cause the line to adhere and to follow continuously advancing tangent points without sideways slippage. The same results can be accomplished by continuously fastening the advancing tangent points to the mandrel with adhesive tape. The formations so made can be preserved and laid out flat for study by rolling paper around the wound mandrel and rubbing over it to impress into it the linear formation.

Study of such formations, covering a range of varying guide widths, guide distances from the axis, diameters of cylinder, and major ratios (but made easier to plot by being kept at zero advance so that left-hand and right-hand contours form mirror images and lie within the same circumferential boundary lines) shows that they all have similarities in shape. If the same experiments are repeated with spherical ended mandrels, the spheres being placed within the range taught hereafter, those parts of the line which are on the cylindrical portion will have the same formations as they had for the same adjustments on plain cylinders. In other words, correctly placed spherical ends do not distort the center parts of the winding lines.

Referring to FIG. 2, and starting where the guide is vertically opposite the winding line's tangent point (102 in FIG. 2), having turned at the end of its stroke and started back, the winding line (laid out flat) follows a generally circular path 1 for a small portion from $a$ to $b$. The curve then starts a gradual decrease 2 which appears to end when the line has reached the center $c$ of the mandrel. From there it runs approximately straight at 3 until the guide reaches its apex at the other end $d$ of its stroke. And, while the guide is returning to the same relative position as its start, it forms a second generally circular part 4 which is similar to and runs into the first circular part.

This invention makes it possible to use the naturally, approximately straight parts of the winding line in simple plots for designing the mandrel, the end forms, and the machine actions for any winding desired. The plots are based on a system that uses the center line of a mandrel C', the straight portion 3 of the winding line from this center line to the point of tangency e of the winding line on the mandrel, the additional straight portion f suspended in air, and the position d of the guide at the apex of its stroke as indexing points. Where spherical, coned, or other shaped ends are to be used on the mandrel, it locates them correctly by placing selectively from a point established by the rule which has been discovered that the best overall balance for the ends of a winding, with the guide working off the face at approximately two times the radius distance away from the axis, is provided when a sphere or other form is joined to the center portion of the mandrel at the point which allows the winding line to lie on the sphere for 180° plus approximately 16.7° of turn of the selected mandrel. The 16.7° is equal (as will be explained in connection with FIG. 3) to 90° of a circumference deducted from the hypotenuse of a triangle in which the radius forms one leg, 90° of the circumference the other, and the angle between the hypotenuse and the radius is 57.5°, the angle whose tangent=$\pi/2$. Where the sphere should be joined to the cylinder is actually dependent on both the ratio of turns of the spindle and the angle of the winding line helix, which is a function of the width of the guide's stroke as is explained later.

This differential of 16.7° and its proportional decrease (called $Df\gamma$ hereafter) is very important where shaped ends are to be used on mandrels. It provides a balance point that can be varied (reduced or increased as explained later) so as to gain advantages either in winding or in the resultant packages. It has the function of locating a turn around area in which the effects from variations in machine action caused by wear, vibration, etc., are reduced to a minimum; in which at its inner edge the paths of helical and spherical section lines follow the same paths; in which, at all times, the formation of an appreciable portion of wound line preceding the tangent point of the line lies in a plane through the line extending to the guide, there is no angular deflection of the line, and it appears to follow a shortest path on the mandrel so that it will not slip either with high or low tension. It appears to mark the lines, top and bottom, that a single loop wind (a one half wind) would follow on a mandrel whose radius=½ the distance from the axis to the guide's path if the off-the-face guide's width of stroke were extended to infinity.

In a winding system that starts with the guide more than twice the radius of the winding mandrel away from the axis of spin, there should be an ever greater number of degrees on the sphere—theoretically, with the starting radius equal to slightly more than zero, two times the differential, or 33.4° should be added. This decreases to 16.7° as the winding radius builds to approximately half of the distance to the guide. From there on the amount on the sphere can be reduced. In fact, it appears that an ideal system, without lag (long dwell of the guide), has a gradual decrease until only 180° fall on the sphere when the guide is working on the face of the maximum stage. Actually, when adjustments can be made to allow winding slightly more than 180° on the sphere the grip of the line is somewhat increased. This is sometimes desirable when using end forms even though it may cause the line to slip outward toward the valleys, the slip being proportional to the additional degrees of the line over 180° arranged for on the sphere.

In plotting the side view of a winding, the differential $Df$ is used in conjunction with a guide system based on a 60° triangle in which the hypotenuse represents the guide's distance from the axis, the short leg represents the radius of the basic or intermediary stage, and the longer leg represents the plane of the winding line between the guide and its tangent point on the cylinder. Since the cosine of 60°=.50, the radius of the intermediary stage of an ideal system is half the distance of the guide to the axis. In practice, since an ideal system in which the guide is truly constant in velocity, even through its turn around area, is mechanically impossible, a method of varying this arrangement in accordance with the lag of any particular machine must be used. This is illustrated in FIGS. 3 and 4.

The lay of the line in every stage, except the zero and the maximum, is affected by this arrangement on a proportional basis. Other adjustments than 60° can be used. The tangent of 60° is 1.7321 or $\sqrt{3}$. Some success has been obtained from 60°34' the angle whose tangent is $\sqrt{\pi}$. An increased angle causes the line to run further out on the sphere, a condition that can be used successfully when working with end forms and especially over a restricted range. A decreased angle causes it to run further inward. This is sometimes a help on small range, flattened end windings but is apt to cause a line to be insecure at the end turn-around area and cause it to fall inward, thus destroying the winding. The angle involved is the angle XAD at the point X (determined in a way to be described) between the axis and the tangent point of the mandrel as seen in the side view (FIG. 3). It is not the angle of the winding line to the axis in the winding line's plane.

The concept given in my patent application S.N. 678,106 of August 14, 1957, is correct in many ways. However, it is assumed a constant condition similar to that of the winding machine on which it was worked out. In practice it is found that, although winding machines generally have constant velocity motion of the guide across the center portion of a winding, the period of turn around (guide lag) at the ends of the stroke varies greatly. This guide lag results from the fact that the guide does not come at full speed to the end of its stroke and reverse immediately, but slows to a stop and then speeds up while the spindle continues to turn. This period is dependent not only on the design of the cam which originates the reciprocating action but on the type and tightness of the linkage through which motion is imparted to the guide and to the rotating spindle and it can vary as a function of ratio of turn (the count of a wind), speed of operation (r.p.m.), and of linkage adjustment. A simple way of plotting this lag for any type of machine is to mount a pen firmly on the guide and take an ink track on a paper covered cylinder rotated at approximately the speed of the intended operation.

FIG. 5 shows a part of such an ink track for a "one" wind. g represents the guide's approach preceding lag, h the curved path of the guide in relation to the surface of the cylinder as it comes to and leaves apex and i the return path of the guide after lag.

Although such a curved path and its effect on the winding line appear complex, this new system simplifies them by reducing the composite to a straight line plot 4 along the guide limit line 61–62 (FIG. 5) tangent to curved path h. This is done, graphically, by continuing the straight line portions of g and i directly first to the guide limit line (and computing the length of the lag, represented by line segment 1 in degrees) and then to their meeting point k which marks the line at which a comparable guide without lag (an ideal guide) would apex. Generally, this lag factor can be retained as the rating for a particular machine (or brand of machine) at a particular ratio (count) of wind. However, if the same cam is to be used for other counts, by reducing the ratio of turn of the cam, since it is difficult to find a formula for the elongation or shortening of a curve plus the effect of projecting it angularly to the guide limit line and comparable guide line, and since r.p.m. may also affect it, a new ink track for each major change in count or speed is recommended.

An ink track plots the action of the guide working on the surface of a mandrel and shows clearly where the guide has reached its apex point in relation to the position of a line wound on the mandrel. This is usually difficult to tell when the guide is off-the-face. However, a measurement that will establish the apex and its relation to the path of the winding line preserved on a rubbing can be taken by mounting a comparator so as to register the apex point, bringing a fine wire into accurate winding position by turning sufficient revolutions of the machine, and marking the parts of the wire which lie on the center line and the guide point. Such a piece of wire will give the distance sufficiently accurately for plotting with this method when taken from either a cylinder or a spherical ended mandrel.

The basic and maximum stages of an ideal system and the adjustments needed for a lag of 15.3° are shown in FIGS. 3 and 4.

The lag or length of dwell in inches of the guide is directly proportional to any diameter it winds. That is, as shown by beginning-of-dwell-lines A–X and X–33 and end-of-dwell-lines A–M and M–64, in FIG. 3, which plot the length of dwell for any diameter in the system, it will be effective for the same number of degrees of circumference on every diameter on which it winds.

The basic stage is designed as follows:

This method depends on five elements: (1) The guide's distance from the axis; (2) the width of the guide's stroke; (3) the radius of the mandrel to be wound; (4) the ratio, including advance, of turns of the spindle to reciprocations of the guide; and (5) the lag of the guide and linkage in reversing. For desired results, some secondary elements which are functions can be substituted and from them these primary elements can be determined. For instance, if a particular angle of wind is desired, from it the proper width of guide stroke can be determined. Any single set of elements comprise an individual winding system.

The form of a basic stage spindle, shown in FIG. 4 is for a "one" wind with zero advance. Later figures show the adaptation of this form to advancing (plus or minus or plus/minus) winds and to winds of a different number or order than "one," as well as the adaptation of the wound end formations shown in this figure to a wind of any shaped central portion and also show modifications for flat and other shaped ends of wound package in place of internally curved flaring ones.

The "basic" is that stage or radius within a winding system which is half the distance of the axis to the guide. It is important because it provides a median point, the valley point 17', through which passes the two end form curves that plot the shape of the internally flared ends of a package wound from zero to maximum with a guide working in one plane.

The side view (FIGS. 3, 3A) of such a mandrel and its system which provides most of the plotting points needed for the plan view (FIG. 4) is constructed as follows: Draw the 0°–180° line B—B and the 90°–270° line A—A. Mark the axis A. Draw at 57.5°, the angle whose tangent equals π/2, A–F and A–G, which mark on any plane drawn vertical between them 180° of circumference of the mandrel of which the horizontal distance of the plane from the axis A is the radius. Draw the cylinder H of radius $R_B$ (or $r$). Draw line I–J tangent to circle H representing its plane unrolled. From the axis A draw at 60° the guide point, plotting line A–L. Where it meets the plane I–J at L it marks the distance of the guide from the axis and thus the maximum radius of the system, circle O. Lines A–F and A–G intersect line I–J at C and V.

Since this system illustrated is to be adjusted for a machine with a lag Y of 15.3°, mark a point X at one-half this distance, computed in degrees of radius $R_B$, on the plane above the guide L and point M at one-half this distance below. In order to time the lagging system on a basis comparable to the ideal, X represents the guide point when it is starting its dwell. L represents the guide halfway through its dwell and M marks the end of the dwell. Draw line A–X. Since, this view, AX and AJ coincide, points V and X coincide. On the plane I–J, mark point K the length of the lag above the zero degree point C.

At distance A–V above V, the 180° point, mark D$i$, the ideal differential determining point which will lie 16.7° above A–N. As a future plotting aid, draw line A–D$i$–60 (intersecting the line P–Q, tangent to circle O) which marks graphically, between it and A–N, the length of the differential for any ideal stage drawn in plane view. Mark S, the basic adjusted differential determining point, at three-quarters of the lag above D$i$.

To draw the basic or intermediate mandrel, construct a plane view by drawing center line C, line A to represent both the axis and a line drawn in the basic plane, at $R_B$ above it, and the perimeter lines of the cylinder H, the upper line $R_2$ and lower line R'. Next draw the guide limit lines 61–62 and 61'–62' at a selected width of guide stroke.

To determine where the spheres 14, 14' should join the cylinder, the winding line 92, FIG. 4, is constructed by plotting point K across to the center line C at 97 and point X to the guide limit lines at 9, 9' and c connecting them to form winding line 92. Point S (which is ¾ of the lag above D$i$) is then plotted across to mark on 92 the junction line point 26, the point where the winding line passes onto the sphere. Draw the junction line 96 vertically through this point and a corresponding line 96' on the opposite side. Centered where these lines meet lines A, draw spheres 14, 14'.

The valley points, the extent to which the wound line will progress outward on the spheres, are found by plotting points F and G (FIG. 3), which represent the 0° and 180° points of the maximum stage circumference laid out, across to FIG. 4 as points 101 on the center line and 24 on the guide limit line 61–62, and drawing line 25 between them. Line 25 gives the angle of a chord which is inherent in the system. It represents a chord within the sphere. A line through 26 parallel to line 25 marks valley points 17, 17' where it crosses the perimeters 14, 14'. It also provides in the same way an angle which is constant for chords similarly located throughout the system and which can be used in any stage to mark that stage's valley point. Through valley points 17, 17' draw valley lines 18, 18' to complete the basic stage mandrel.

Helixes wound at low tensions have a tendency to wander and, although it is part of the theory of this method that correct machine adjustments and operation and a correctly formed mandrel will build up a winding (when advance is used, as explained later) which will pass through increasing diameters in approximately the same contour shapes as perfectly shaped mandrels for those diameters, in practice it is difficult to do this with some round and slippery substances and without fine adjustments. One fundamental reason is that a helix running in one direction that has strayed inwardly is immediately followed by one running in the opposite direction which will compensate by straying outward and that, if no provision has been made to restrict it, it is possible for the line to fall off the edge of the winding and all the way down to the level of the spindle itself. This would not only leave this line out of place but would leave a void in the end formation that will effect future lines. Although the tolerances in winding with this method are fairly broad, it is advisable whenever possible to take advantage of the method's ability to plot the valley points for all diameters within the system and to use end forms as shown.

For the mandrel of FIG. 4, such an end form 22 is plotted by a curve centered at a point 23 equidistant from 19 at $$\frac{\text{lag max.}}{2}$$

(that is, the lag at the maximum stage) below 13, where the center line C meets the axis A; from 17', the basic valley point; and from 27', a point at $$\frac{\text{lag max.}}{2}$$

above 20' where the maximum cylinder's perimeter line $R_2$ meets the actual guide limit line 61'–62'.

For a winding starting on a smaller stage (mandrel of diameter less than $R_B$), curve 8' is used. It is centered at 11 which is equidistant from 13, where the center line meets the axis; from 17'; and from 20'.

In FIG. 4, centers 23 and 11 would actually lie outside of the black line margin, being formed at the intersection of continuations of lines 23a, 23b and 11a, 11b respectively. The end form should have an axial radius slightly shorter than the maximum cylinder's or it will interfere with the guide.

When such end forms are used they stop all fall out, prevent harmful wandering, by correcting it at either end and build perfect self-supporting ends even with very slippery, very low tensioned lines and loose machinery. The curves 22 and 8 pictured in FIG. 4 indicate the extreme points of the center line of the end loops of the wound substance. If a tapelike or a large diameter line is to be wound, an allowance of half the width or half the diameter should be made so that the center line of each loop can lie on top of the valley point. This is also true of valley lines; and, if a tape be quite wide in proportion to the diameter of its mandrel, the spherical contour outside of the valley point should be raised into a cone approximately tangent at the valley point or center line of the substance so as to support the outer edge of the first layer of tape.

To complete the side view grid so that it can be used for plotting all stages, draw crossover point plotting lines for the lower positions K–S6 (S6 is the intersection point of B—B with circle H) and K–F. Draw A–K and K–P for the upper positions. P is at Df max. above the maximum zero degree point F. Draw 70–S and S–60 for plotting upper, and S–S5 and S–N for lower position differential point plotting lines. Point S5 is three-quarters of the lag above S6, point 70 is three-quarters of the basic lag above A. Then draw X–33 for lower position and X–30 for upper position major stage guide point plotting lines. Point 33 is half the maximum stage lag above G and 30 is Df max. distance above 33. Also draw L–G and L–31 for plotting the major stage actual guide point in both positions. 31 is Df max. above G.

The perimeter of the system, O, from L to 34 marks the points, in the lower positions of the minor stages, when the guide is half way through its dwell. The guide-at-beginning of dwell points for plotting the winding line, are found on an arc from X to 34 which passes also through points, on planes drawn vertical between A and R, the same distances above perimeter L–34 as are intercepted on the planes by lines A–X and A–L. Such an arc is shown centered at 35. A similar arc, from M to 34, shown centered at 36, marks the end of dwell points, the arc measuring below the perimeter the distances intercepted on the planes by A–L and A–M.

For the upper positions of these arcs, draw arcs from X, L, and M to S6 which pass through points that mark the same distances on planes as are marked by the lines A–X, A–L, and A–M. Such arcs are shown centered at 44, 45 and 46.

Most commercial winding at present is done with the guide sliding on the face of the winding. This makes plotting the actual course of the winding lines simple because, on flat sided mandrels such as cylinders and cones, the guide point and the winding line correspond at all times. One reason it is done is that the rate of withdrawal of the guide, needed for building flat ended windings (as will be shown later), is the same as the rate of growth of the radius of the package. Another reason is that, even though the guide may be harming the wound substance, it is almost impossible to withdraw it, unless practicing this invention, without causing considerable extra sliding of the substance at the ends of the winding and, consequently, generally poorer packages. With this new method it is possible to provide spherical ends for continuously on-the-face windings as well as for off-the-face. However, they are plotted as the maximum stages of a number of systems superimposed. Each will be a larger sized system with a greater guide-distance-from-axis (the rate of withdrawal) but the same width of guide stroke. (The guide must be fitted with a skid which extends sideways far enough so that it will bear on the cylindrical portion when the guide point is over the decreasing radius of the spherical part if the wound package is to cause the retracting.) The designing of a maximum stage for the mandrel of FIGURE 4 is done as follows. (Instead of a wound mass, this could be the shape of a starting mandrel, if the guide were allowed to retract.)

For FIG. 4, plot from the zero degree point F., FIG. 3, the lower position crossover point 101 on the center line C. Since the line the guide travels on the cylindrical part of the mandrel and the winding line correspond throughout this stage, the winding line and one half of the lag for this stage will fall within 180° of its circumference and will cover a full half width of the guide's stroke. In other words, the winding line M9 will run from 101 to M2 and lag to 24'. These points are plotted from G, the maximum stage 180° point and 33 at $$\frac{\text{lag max.}}{2}$$

above it.

Draw the perimeter lines 93, 93' of the maximum cylinder. Since, when this stage is in perfect adjustment within the system, only 180° of line appears on the sphere, the over the axis line A marks on M9 the junction point M4 for the sphere. Through it draw M5–M6 and its sphere M8. The end form curve 20'–17'–19 already constructed in FIG. 3 marks the valley of this stage at point M91 where it meets the sphere. Draw valley line M91–M100 to mark the point the winding line will wind out to on the sphere.

A second way of locating the valley point is to raise the winding line to a higher position. The amount to be raised is equal to the Df max., FIG. 3, which is the distance between 60 and N. This distance has already been marked up from the crossover point F to P, from the guide plot point 33 to 30, and from guide at apex point G to 31. Projected into FIG. 4 these points P and 30 become M11, M12 through which the upper position winding line M13 is drawn. M17 is half the lag below M12. 60 projected meets M13 at M18 which, like M4, lies on the junction line M5–M6.

When any winding line is shown in the correct position in the system, the angle of the chord represented by line 25' in FIG. 4 becomes common to it and, joined to it at its junction line at point M18, will indicate a chord that marks on the perimeter of its sphere the extent to which it will wind out on the sphere. This line parallel to 25 through M18 (which coincides too closely with M13 to be drawn separately) in FIG. 4 marks valley point M100 coinciding with the valley line M91–M100 already established by the end form curve.

The placing of sphere M8 as described was arranged by the grid for receiving 180° of turn of the winding line. In practice, a winding that starts at the basic stage will probably wind out somewhat irregularly due to adjustment of advance that is not precisely correct in proportion to other elements of the wind or to some other factors and will fill in the decreasing radius somewhat so that, possibly, in same layers somewhat less than 180° are being wound on the sphere, or on the ovoid shape that has developed from a sphere. This will still give a satisfactory wind in some cases, retaining a great part of the encircling and tying-in characteristics and the resultant stability. However, if it is desired to start a wind at or near the maximum stage, as for an on-the-face wind, and it is desired to have more than 180° on the sphere, the grid in FIG. 3 can be modified as shown by lower position differential determining line S–W and upper position line S–89, which, for illustration, have been raised from normal by half the maximum lag.

As a result of the change, points 89 and W plot across to locate M14, at intersection with M13 for the upper position, and M15, for the lower, in place of points M18 and M4; and they place the junction line at M3 in place of M27, and the sphere at M7 in place of M8.

The method of determining the valley point by use of the common chord locates it on the same end form curve 22. This also holds true if the sphere builds further outward from the center and is one reason the end forms prove so helpful in achieving a good wound package. They form the flared internal end correctly regardless of lack of precisely correct adjustment of some other factors.

In order to wind off the face a distance less than that shown in the basic stage in FIG. 2, it is necessary to start (FIGS. 6 and 7) with a major stage mandrel, one whose radius is greater than $R_B$ but less than R max. (A–O). This is done by drawing a cylinder L1 in side view at the selected radius $R_L$ and its plane view L2. Where L2 crosses the lower crossover point marking line K–F (determined as in FIGS. 3 and 4) at L5 and the lower guide at dwell plotting line X–33 at L4, it is marked for plotting in the lower position and, where it crosses upper crossover point line K–P at L3 and upper guide plotting line X–30 at L7, in the raised position. These points are projected into FIG. 7 as L50 and L60; and L30 and L70, and the winding lines L51 lower and L61 upper are drawn between them. Draw the perimeter lines L80 and L80′ of the cylinder L1.

In FIG. 6, marks should be made where L2 crosses the lower and upper differential marking lines at L8 and L9 and projected into FIG. 5 to mark on each line at L54 and L55 the junction line L52. Centered on the intersection of A and L52, draw the sphere L53. For the lower line, the valley point L56 is marked by the end form curve 22 for valley line L57. For the upper, the chord L58 at the angle common to the loops of the winding lines of this system (line 25′, FIG. 4) can be joined at L55 where L61 enters its sphere to mark valley point L59 which will correspond to L56 already established.

In order to wind more substance into a given system, the winding must be started on a diameter smaller than the basic. Such stages are also used when it is desirable to have the guide removed a considerable distance from the face of a wind, for instance, so as to allow space for a guide needed in the winding of metal strip.

To plot such a stage, draw cylinder S8 in FIG. 6 and its plane S12. Where it crosses lower position crossover point line S6–K, differential determining line S5–S, and arc X–34, mark S13, S9, and S1. Projecting these points into FIG. 7 give crossover point S61, junction line point S59, and guide-at-top-of-dwell point S62. Draw the lower position winding line between S61 and S62. Draw also, perimeter lines S64, S64′ of the cylinder. Through S59 (projection of S9 on S61–S62), draw the junction line S65 and sphere S66.

The minor stage end form curve 13–17″–27 marks the valley point S71 through which valley line S72 can be drawn to complete the mandrel.

In the major stages more and more degrees of the winding line from the crossover point to the tangent point are being wound onto each progressive radius before the guide reaches apex. This phenomenon starts with the smallest stages and progresses proportionately up to the maximum. However, it is more easily studied here in reverse; that is, in relation to the basic stage. On the basic, there are $90°_B + \text{lag}_B$ degrees wound on the mandrel (vertically) from the crossover point to the tangent point with the guide at apex. Working backwards toward zero, the amount decreases continuously until in small stages less than 90° is wound after the crossover point before the guide reverses. This is shown by the drop of crossover point line C6–K below the quadrant line A–F.

As previously, raising the winding line to an upper position will allow placing the valley point by a different method and thus afford a check on the end form curve plotting or allow the avoidance of plotting it. This is done by raising the winding line to the upper position in the grid. It will then be marked by its junction with upper position minor stage crossover point line K–A for its crossover point S14 and by arc X–S6 for guide at dwell point S18. S15, the differential marking point is found from line S–70. Projecting points S14, and S18 into FIG. 7 mark S76 and S77 and draw upper position winding line S73. Project S15 to S74 (or S73) to mark junction line S65 as already drawn. Draw S74–S79 at the common chord angle. Where it crosses the perimeter of sphere S66, it marks the valley point S79 and places S72 to coincide with valley point S71 already established by the end form curve.

Although it is believed that winding on mechanically correct machines, correctly proportioned to the substances being wound, will, when advance is added, build out formations that grow continuously in the contour shapes illustrated, it is not necessary to achieve such difficult adjustments or to progress through such exact shapes in order to produce successful packages. There is a great increase of tying-in and enclosing as well as increased spring outward in this method that allows success in spite of considerable distortion from the perfect shape, provided the change from it is gradual and the starting shape, or the shape of some intermediate portion, particularly the end formation, has been approximately correct.

The distortions that are most usual are (1) increased radial growth at the crossover line (caused by lack of flexibility of the wound substance and an advance reduced to a minimum, so as to increase the length of wound substance in the finished mass) and, (2) increased radial growth at the ends (caused by winding on smaller than proportionate diameter mandrels), so as to enclose a large length in a minimum diameter, and by the general looseness of machines and process at high speeds; also caused by setting up to wind slightly narrower than the perfect end form shape so as both to square the ends somewhat and to insure against the line's falling off the end of the wind when no end form is used.

The change in shape at the crossover line does not generally affect stability adversely. In fact, if the decreasing radius ends of this method should be formed on any rotational shape of center portion of a winding, at the correct angles of wind (and this follows in the above case), the wound package would have the increased stability of this method.

The distortion at the ends is inconsequential if the winding is to be contained endwise. However, if carried to an extreme, the final layers will have greatly reduced enclosing grip on the layers beneath them and may allow the earlier layers to escape outward when containment is not provided or may shell inward themselves. Such a condition can be avoided easily by either moving the guide inward toward the axis or by increasing its width of stroke slightly. Plotting by this method will show that the winding will then cover a slightly wider area so as better to enclose the underlying formation.

In view of the versatility of this method, it is not my intention to claim only for perfect cylindrical or ovoid centers or perfect spherical ends. Windings, by building up on a multitude of very slight changes, build distortions that are mathematically difficult to describe but that are proportional in shape, as far as effective winding is concerned, to the simple shapes of cylindrical or ovoid center portion with simple spherical end portions. In fact, there are indications that within determinable limits of this art, for any reciprocating motion in space, which finishes on both ends of the stroke with an area of sinusoidally decreasing speed, there is a mandrel shape which will wind up a non-sliding line of bendable linear substance into a self-supporting package.

In addition to the fact that this method is not generally dependent on precise formations, the fact is that a winding need not be of the same nature from beginning to end to gain stability from this method. Either outer layers built on my stable wind or inner layers enclosed by it may be advantageous. This latter is illustrated by commercially wound balls of cord whose inner layers are frequently wound unprecise practically to the extent of being random, but which finish in the outer layers with a precision wind that encloses and stabilizes the entire mass. A wound package need not be composed consistently out of the same general precise formation.

For simplification the preceding method was described at zero advance. Of course, in actual practice, it is usual to cause crossovers to progress angularly around the spindle in the so called universal or pi wind. This is accomplished by having the rotation of the spindle slightly out of phase with the movement of the guide, so that for example for a "one" wind, for each thirty complete reciprocations of the guide the spindle makes sixty-one revolutions (positive advance or "plus" wind) or fifty-nine revolutions (negative advance or "minus" wind).

Advance can be worked out in degrees for any radius so that various kinds of fit of one line beside another, when the advance is small in relation to the diameter of the wound substance, or of open mesh when the advance is large, can be caused on the winding. This can be done so as to have crossovers in progressive layers lie on top of one another or so that they will avoid lying on one another and these objectives can be obtained with either "plus," "minus," or "plus-minus" winds, as is already known in the art. If a payout hole is built into the coil, it can be sized so as to fit the preferred pattern.

Rules and theories formulated from zero advance studies hold true for advanced winds and mandrels designed for zero advance can be used when the advance is small. However, when designing a mandrel for a known advance, it is advisable to adjust for it. This is done by modifying the side view grid to allow for the advance so that the spheres will move outward for plus advance or inward for minus advance.

Since approximately one-half of the advance per half stroke of the guide will fall on the sphere in plus or be missing from the turn of the line in minus, adjustment is made for this amount.

For illustration, in FIGS. 8 and 9, an advance of 16° plus has been selected. On the basic plane I–J, raise the crossover point 8° of basic circumference above K, the zero advance point, to Ka and draw minor stage-adjusted-for-advance-crossover-point-marking line A–Ka. On the maximum plane mark Fa and Pa 8° of the maximum circumference above F and P, and draw lower and upper adjusted - for - advance - crossover - point - marking lines Ka–Fa and Ka–Pa.

Plotting these points across as before, instead of the points they replace, proceed as before. Draw adjusted basic stage winding line 92a from 97a to 9. Where it is intercepted by the differential at junction line marking point 26a draw junction line 96a in place of 96 and sphere 14a in place of 14.

Because advance actually stretches out (or contracts) the system, the common chord is also modified in a similar way. In place of line 25 extending over 180° of the maximum circumference, line 25a is drawn from 24 to 10a at 8° max above 10. As before a line parallel to 25'a is drawn from 26'a to the rim of sphere 14a to mark the adjusted valley point. This will now fall at 17a instead of 17 and the end form curves must be modified by plotting from the same anchor points 13 and 20 and 19 and 27 as before in combination with 17a, equidistant points to replace 11 and 23. The change is slight but the effect can be very beneficial on a truly precise wind.

For the maximum stage, draw lower and upper winding lines M9a in place of M9 and M13a in place of M13. Where line A joins M9a at M4a or the projection of point 60 joins M13a at M18a draw the adjusted maximum stage junction line M27a to replace M27. Draw the sphere M8a centered on the intersection of lines A and M27a. A line M9a at the common chord angle of 25a drawn from M18a to M10a marks the adjusted maximum stage valley point and indicates that the proposed modification of the end form curve will join the valley correctly.

Since this is simple substitution of adjusted points, the illustration given should be sufficient to allow similar modification of minor and major stages.

The previous description of designing has been for use with a "one wind." However, the same method can be modified for use in designing mandrels for other orders or counts.

The simplest transition is to winding higher counts with a different cam for each count so that the actions of the cams in their turn around areas are all the same.

In these cases, the diagrams of FIGS. 3 and 4 are modified by increasing (or decreasing) on the basic plane I–J the distance between C and the over-the-axis point D. This increase or decrease equals 180° for each full count. The same proportional increase, between N and F, is given to the maximum plane PQ. The formula for both X–C and N–F then becomes $$(Ct-1)\pi R_x + \frac{\pi R_x}{2}$$

where $Ct$ is the count.

By plotting into the plane view as before, any stage in the system can be constructed. The common chord of FIGURE 4 is based on the last 90° above the line A and 90° below, as it is shown in FIGURE 4.

The other transition is through changing the ratio of turns of spindle to stroke of the guide without changing the cam. This is beneficial in fractional counts because the lag factor decreases.

On higher counts, slowing down the relative motion of the guide increases the effective lag. The best method of designing is to measure the lag for the new count directly from the machine after it has been adjusted to produce the wind. The lengths of the legs D–C and N–F are then increased to $\pi R_x$.

$$(Ct-1)+\frac{\pi}{2}R_x = \pi R_x(Ct-1/2)$$

At C–K the new lag factor is multiplied by the count and added. At the other places indicated in FIGS. 3 and 4, it is added in the quantities indicated by the diagramming.

It is advisable to check by trial and error the distances outward that various stages in the sysem will wind so as to construct end form curves correctly, because excessive lag makes the angle of the common chord difficult to determine from plotting. However, once the angle is determined, it should be usable for all stages.

For plus or minus advancing winds the correction $$\text{Count}_x \frac{Adv}{2}$$

is added or subtracted to the lag before the points are plotted.

In developing the new method of designing for constant velocity and constant acceleration guide motions, I have found that there is a system of mandrel (or, wound package surface) forms, which extend from zero to maximum in any system and have spherical end turn-around portions, for any reciprocating guide motion in space. Since all but the maximum form in any system are wound with the guide spaced from the surface, these systems might seem to be less advantageous than the present practice of winding with the guide on or very near the surface and moving with the surface's build-up of radius away from the axis. However, this is not true.

This new method of designing actually allows plotting with certainty changing-plane-of-guide windings, the guide being either on or off the surface. This is accomplished by considering on-the-face winding as the superposing of maximum forms from continuously enlarging systems and off-the-face windings as the superimposing of inner stage forms, each from a system with (in its most practical form) the same width of guide stroke but with a continuously increased or decreased guide distance from axis, the changes being in some proportion to the growth in diameter of the wind.

This concept, carried further by superposing variations of lateral spindle position, guide width of stroke, guide distance from axis, and ratio of spindle turn, leads to the plotting, this method, of many possible varieties of configuration and shape (including flat, cylindrical, true conical, and variations of the internally flared ends) and angles of wind and, inversely, provides the formulas needed for speed of guide retraction or approach, narrowing or widening of stroke, or change in ration, in proportion to build up of the wound surface, for winding such variations successfully.

The winds illustrated above have been based on a guide operating at a set distance from the axis and with a set width of stroke. With this new method of designing, it is possible to plot useful variations in package shape which can be produced by changing either the guide's distance from the axis or of its width of reciprocation, while the winding is progressing. Since changing the guide's distance from the axis is mechanically simpler than changing its width of stroke (which must be done by providing a means to change continuously the position of the guide's pivot point 90 in FIG. 5 of my Patent No. 2,828,092) and since by means of it practically all of the effects of winding with changing width of stroke can be achieved, I have illustrated such windings in FIGS. 10 and 11. One type has already been described in my Patent No. 2,828,092. However, a method for designing it and of adding a more stable form is provided here.

A simple mechanism for changing the guide's distance is shown in my Patent No. 2,828,092. However, I have found it more advantageous to operate the ratchet wheel 111 by means of pawls activated by opposed solenoids, the operator being provided with a switch by means of which he can determine whether the guide will be moved away from or toward the axis and the impulse to either solenoid coming from a double pole double throw switch substituted for switch 132 in FIGURE 4 of my Patent No. 2,767,938. This will work with either plus, minus or the plus/minus advance shown in that patent.

FIGS. 10 and 11 show a flat ended package, achieved by moving the guide away from the axis at a steady rate. It starts with a basic stage situation and maintains that type of situation throughout the winding. The guide's rate of retraction relative to the wind is shown by comparing P1, P2, P3, consecutive plots of surface build up with G1, G2, G3, relative consecutive plots of guide position, that wind it. The radius built up depends on the type of wind being made and the diameter of the substance being wound. However, it is not difficult to gauge the approximate rate for initial set up and to readjust the ratchet device for best operation. This can also allow for lag and advance. If very fine wire is being wound and the rate of retraction must be very slow, a standard stepping relay can be introduced into the circuit, the switch actuating the relay and the relay actuating one of the solenoids after a selected number of stages.

For simplicity of explanation, both lag and advance have been omitted from FIGS. 10 and 11.

FIG. 10 uses the grid of FIG. 3 but modifies it because lag is omitted. The line A–F at 57° 31′ to line A is used in place of adjusted lines A–K and A–F and the 60° line A–L is used for guide positions in place of the adjusted line A–X. For plotting common chords, the lower 57° 31′ line A–G is used as before. Plotting as before from FIG. 10 into FIG. 11 transfers the crossover points W1, W2, W3 to 97b, 98b, 99b and guide points G1, G2, G3 to G1b, G2b, G3b. The winding lines 92b, 93b, 94b are drawn to connect them. The differential plotting line A–R provides points R1, R2, R3 which plot to 26b, 27b, 28b, where they meet their respective winding lines and thus mark 96b, a common junction line.

The maximum planes provide upper points F1, F2, F3, and lower points 33b, 34b, 35b which plot to 10b, 11b, 12b, and 43b, 44b, 45b between which are drawn common chords for the three systems 46b, 47b, 48b to provide the angles of the valley point lines 46′b, 47′b, 48′b, to mark valley points 17b, 18b, 19b. These, falling in line, show a flat end 20b for the package, which has the preferred enclosing shape that provides stability.

The same flattened ends 20b can be made from other starting adjustments than basic if desired. The nearer the guide to the face of the wind or mandrel at the start, the nearer its rate of retraction comes to the rate of build up of radius. This can be seen graphically at P1, P2, P3 where, if the guide were on the face P1, it would be winding a maximum stage at the start, and would retract to P2 to wind P2, and to P3 to wind P3.

By retracting at a faster rate, in either of the above cases, the flat end 20b could be made to slope inward toward the center of the package and by retracting slower (the maximum stage set-up could not be used for this) it can be made to slope outward until, when not attracting, the end form shape of FIG. 4 is formed.

Again, for simplicity of explanation, both lag and advance have been omitted from FIGS. 12 and 13. Addition of either factor complicates the designing drawing greatly while small adjustments, on the machine, of the set-ups of both FIGS. 10, 11 and 12 and 13 will fit either for use with both lag and advance.

In FIGS. 12 and 13 is shown the method of designing a wound package having round contoured outer ends and cylindrical inner ends in place of flared cones. This is made by starting to wind C1 with guide at distance G1 from axis A (FIG. 12) and with width of reciprocation twice G–G′, FIG. 13.

As the winding progresses, the guide is moved continuously toward axis A until it goes through G2 while winding C2 and ends at G3 while winding C3.

When starting at G1, mandrel C1 is in a minor stage relationship; at G2, the wound C2 surface is in a basic stage relationship, and when it reaches G3, it is running on surface C3 as a maximum stage and the winding cycle must be discontinued. The only way the same formation could be continued would be to withdraw the guide and increase its width of stroke so as to go through a new cycle of the same kind.

All plotting has been done on the drawing in accordance with that described for FIGS. 3 and 4. By means of this method of winding, any preferred angle of wind can be maintained throughout an entire winding.

Since $G1-G2=G2-G3$, the rate of approach in FIGS. 12 and 13 is constant, the ratio of approach to radius increase being (length G1 to G2) to (length C1 to C2).

By plotting, first, the effect desired in a winding, infinite combinations of guide distance, width of throw, and rate of either approach or regression can be planned to accomplish it by this method and it will wind successfully. This is possible because any cylindrical, for constant velocity, or arced, for constant acceleration, center portion, plus spherical end portion, can be used as some stage of an infinite number of basic designs, each having a different guide distance from axis and a different width of stroke, and this allows selecting a starting set-up that will allow the progression needed to achieve the secondary effects that will build the shape desired. It should be noted that every loop of any winding designed by this method contains, at its outer end, an end circular part which is complementary to its central helix.

Also, for perfect winding, correct machine settings, etc., the take up device (spool or mandrel) and the machine which turns it and guides the substance to it must be considered as one. It is not possible to achieve orderly results unless both the spool or mandrel and the machine settings match.

It is also worth noting that this method of designing brings together windings of both the quick traverse and slow traverse types, leaving out only winds of the truly random type. It shows that, for best formation, winds of the slow traverse type should be considered as being the same as winds of the quick traverse type except for the element of high count.

One form of winding which will be given new value through this method of design is the honeycomb type in which the advance ratio is worked out so as to leave the wind penetrated throughout its wall area by a multitude of radial holes which will allow the easy, thorough, and even penetration of dye, sizing, or other solutions. Because former windings were limited to narrow angles, this type could not be developed fully and complicated variations requiring more elaborate winding machinery were frequently substituted. Now simpler forms wound by simpler machinery are possible.

Such winds can now be wound at any angle of wind from near zero to near 180°. They are achieved by using advances that cause layers to build over one another or almost over one another, in subsequent layers after any preferred interval. For example, a wind at 6° advance would build all of its crossover points on top of one another throughout every layer. Any even divisor of 360° will cause a repeat from layer to layer in the same way. However, other variations can be worked out which will leave the wall porous but which do not have continuous undivided holes all the way through the wall area. Some of these have the advantage of porosity combined with greater stability and with a lack of high pressure areas which sometimes result from stacking up too many crossovers on top of one another. Winds of this honeycomb type can be made satisfactorily by this method merely by selecting the correct ratio of wind.

FIG. 1a shows a machine comprising a spindle 12 according to the invention mounted on a shaft 301 driven by the motor 302, through gearing 303. The motor drives a shaft 304 which through a heart-shaped cam 305 drives a slide 306 having a pin 307 engaged in a slot 308 in a lever 309 pivoted at 310, and also provided with a thread guide 311. This arrangement moves the guide back and forth along the spindle, and is of the type shown in Patent No. 2,828,092.

FIGURE 14 shows a package produced according to the invention where the ordinary universal wind machine, such as shown in the patent to Wardwell, No. 480,157, is used but with the guide moving in a fixed line. This package has a central axis core with a cylindrical center part 162, intermediate parts 164 of outwardly decreasing cross-section, and outwardly flaring ends 166.

FIGURE 15 shows a package produced on a machine such as that shown in the Taylor and Whipple Patent No. 2,634,918, in which, by varying the relative speed of the spindle and guide, a radical hole is produced into the axial core through which the inner end of the material can be drawn out. The central axial core has the same shape, but there is a radial hole 170 through which the inner end of the material can be withdrawn.

Such a package may also be producel with alternating plus and minus winds, as described in my Patent No. 2,828,092.

The general theory of why the design of my mandrel and shape of winding is so advantageous is not easy to define. However, I believe I have proved that there is a shape (or formation) that incorporates a specific shortest path on its surface, the shape and the path being so contrived that a winding machine of the quick traverse type causes a wound substance to form continuously over that path in such a way that the relative shape and its relative shortest path are retained throughout the growth of any winding; and that this combination results in the greatest possible stability for the wound substance both during the winding and in the unsupported package of wound substance that results.

Another part of the theory is that I have invented a wound package formed of overlaid loops and a shape on which to wind it, each half of each loop being composed of a combination of cylindrical helix and circle, the circle being at an angle complementary to the angle of the helix, the whole contrived so that, regardless of the ratio of degrees of turn of cylindrical helix to the degrees of turn of reverse circle, the half loop will always follow approximately the same relative path.

Another point is that I have invented a wound package formed of overlaid loops, and a shape on which to wind it, in which no part of any loop is subjected to angular deflection.

Every loop of such a package contains, at its outer end, a circle portion which is complementary to its cylindrical helix portions.

As shown in FIG. 16, the line 101 enters on the spherical end at 102 and leaves it at 103, and its path on the spherical portion exceeds 180°.

The most stable windings, composed of a number of layers, appear to be those in which there is the least rapid change of winding angle from layer to layer. From this it follows that the innermost and outermost stages are generally somewhat less stable; also, that the central layers of a large diameter design are somewhat more stable than a wider span of layers of a small diameter design. However, when solving a particular problem of mechanics of winding or to obtain a specific result in the wound package, there are possible advantages in all stages that should be considered.

If there are limitations in the machine to be used, it is obvious that more substance can be built into a winding that starts at a minimum stage and proceeds to a maximum. Also, if control of the wound substance during payout is being sought and there is a limit to the width of throw of the guide that prevents winding at a wider angle, the inner stages, at any angle of wind, have relatively more end closure than the outer stages. This closure tends to control the loops during payout.

There is a mechanical and a control advantage in winding the outer stages. The shorter the relative distance from guide to tangent point, the more the line is definitely controlled by the guide. Vibration, irregularities of surface, wound substance condition, and machine gearing have considerably less effect on the short line. Also, the shorter the relative distance, the greater the mechanical advantage. In the early stages a great amount of guide action results in little substance wound. As the winding progresses, more and more substance is wound for the same amount of guide action.

If the ratio of turn of spindle to stroke of guide is adjustable and the substance to be wound will pay out satisfactorily from such a wind, a multiplex wind should be considered. Such a wind has more than two turns of the spindled to one completed stroke of the guide, the average being added usually in multiples of 180°.

Since this method allows unlimited choice of angles of wind, the angle of wind should be given careful consideration. It depends on the machine to be used, the substance to be wound, and the result to be achieved. Some substances that are subjected to damaging shearing action at a cross-over angle of 90° are amply protected at angles either considerably smaller or larger than this, say at approximately 30° or 120°. Also, some substances will pay out at high speeds from small angle winds while others will do better at wide angles, depending on the type of substance, its relative spring characteristics, and its cross-sectional shape and on the mass, shape, and size desired in the finished package.

This same method can be used to produce mandrels with variations in center section shapes similar to those shown in my patent application S.N. 344,875, filed March 26, 1963, and to produce mandrels in which the center section is conical in one direction only rather than in two.

It should be apparent that this method is producing and adjusting machinery, which makes possible the laying on of slippery substances under minimum tension and which results in maximum utilization of self support characteristics, provides unlimited opportunities for improving both the mechanics of winding and the packages that result. It should open up to all bendable substances types of winding machines and forms of winding that have heretofore been reserved for specific substances whose peculiar characteristics have allowed satisfactory results with relatively undeveloped winding processes. Although the elements involved and the advantages to be gained are too numerous to list in detail, one versed in this art should be able to balance one factor against another so as to succeed in designing satisfactory, self supporting packages for many substances formerly thought to need strong support and for many substances heretofore found impracticable to wind.

After consideration of the characteristics of the substance to be wound, the mass or amount of it to be built into a package, the type of payout, and the shape of the finished package preferred, some of the most important factors to be considered in designing the winding are the minimum diameter, the ratio or order, the angle at which to wind, the advance of the wind, the particular shape and the final diameter. With these determined, anyone versed in this art can use this system of design both to design the mandrel and end forms on which to wind and to set or adjust the machinery so as to achieve the winding.

FIGS. 17A to 17G shows the collapsing of a wind according to the invention.

In selecting winds to be produced by this new method, the designer is not limited to the plus, minus, and combination plus/minus advance winds of my Patents Nos. 2,634,916 and 2,634,922, issued April 14, 1953, and applications S.N. 344,874 and S.N. 344,875, filed March 26, 1953, which pay out through a radial hole.

Industry has been finding many uses for end payouts from cops, spools, and reels and from specialized packages. In general, these have been limited to over end (outside) payouts, with consequent difficulties. Although relief from the cost of cops, spools, and reels, and from some of the intricacies of specialized packages provides one incentive for replacing the present types of packages with self-supporting windings, the center payout made possible by self-supporting winds, with its control of both payout and centrifugal loop and its first-in-first-out principle, offers additional incentive in many cases.

For either center or over end payout, the plus, minus, and combination plus/minus advance winds, wound by the new method but without the radial hole, can be used. Of course, windings with the radial hole can be payed off from the end, if the user should prefer it, by ignoring the radial hole. However, there are advantages in winding without the hole if it is known to be not needed.

In winding many substances with the new method the advance can be closed up considerably, so as to reduce the air spaces within the layers, without causing damage to the substance. With substances of this type and especially with others that will not allow closing the advance, the finished mass can be reduced by collapsing the wound package under pressure. Greater protection in packaging, improved control of payout, higher speed of payout, and greater linear speed with less r.p.m. in winding are other advantages that can be gained through this collapse.

Various forms of collapsed winds are possible, each type having different characteristics that are advantageous. First, there is partial or complete collapse circumferentially. This includes winds both with and without the radial hole.

Second, there is partial or complete collapse axially. This also includes winds both without and with the radial hole, it being specified that the radial hole be kept open by the insertion of either a temporary or permanent plug or tube while the other portions are collapsed.

Although I do not claim to have invented all forms of collapsed winds as such, packages wound with my method make possible many improvements in this specialized art and collapsed winds which originate from this method have definite advantages.

FIGURE 17A shows a package 170a produced according to the invention with a radial hole 172. This is a "one" wind. The hole may be omitted if desired.

FIGURE 17B shows the same package 170b collapsed radially by central pressure. Upon such collapse, the central portion 174b is more reduced in diameter than the ends 176b.

FIGURE 17C shows one end 176c of the package 170c collapsed to the same diameter as the central portion 174c. Both ends may be so collapsed if desired.

Experience in winding various substances in the novel formations described above discloses stability for coils of all of them far greater than could be attained by any previously known winding method. This experience includes windings of substances such as copper tape .002" thick and .187" wide and of Mylar plastic tape .002" thick and .0156" wide, substances formerly considered impossible to wind into any self-supporting form. These windings have been made with the most elementary type of tensioning device.

The chief disadvantage has been that, when wound in the manner originally described, a new collapsible mandrel must be constructed for every new variation in starting diameter or new width of starting layer. If they are to be used, a new pair of end forms must also be made for each new mandrel, and these entail a fairly critical fit where the end form joins the sphere of the mandrel. Both mandrels and such end forms are expensive and time-consuming to construct.

A second disadvantage in cases where a maximum of wound substance is desired in a minimum of space, as in a winding of cable to pay out from a sonobuoy or behind a missile, is the loss of the airspace formed by the rise of the mandrel above the cylinder of minimum closure of the ends of a coil.

Both simplification of the mandrel, the width factor being obviated and the form and collapse becoming elementary, and saving of space can be accomplished as follows (FIG. 18): A cylinder 105 containing an axial central hole that will fit the spindle of the winding machine is turned to the required diameter and made fast to the spindle. A paper or cloth 106 wider than the finished winding and long enough for an overlap is wound around the winding area and made fast with rubber bands, adhesive tapes, or straps.

A winding is designed or worked out on the spindle to take advantage of the reduced tendency of a wound loop to slide at its turn-around point if its angle of wind is reduced. To do this, as shown in FIG. 18, it is started with the guide retracted (Gd1) considerably further than normal. As the winding process begins, the guide is approached toward (Gd2, Gd3) the axis at a rate to cause widening of consecutive loops and leave each loop end overlying its predecessor slightly. This produces gradually widening layers Ld1, Ld2, Ld3.

If the substance to be wound or the starting angle of wind is such that the first turns might slip inward either when being found or during later phases, a second cloth or paper, of a width to lie just within and support at both ends the apexes of the loops of the first layer, is wound upon the first paper, centered in the winding area. It must be of a length to make enough turns to form a rise that will prevent the wound substance from rolling over it, a little higher than half the diameter usually being sufficient. This piece is also fastened with rubber bands, adhesive tape, or straps.

The reciprocations of the guide must be at least as wide as the desired width of the finished winding and usually will be a little wider. As the guide continues to approach the face of the winding, a formation is built up that is similar to the shape previously described as most advantageous for gaining maximum self-support in a winding, that is, in all except the inner layers there is at each end a portion of a loop of substantially spherical nature with an extent of more than 180°.

Depending upon the desired shape of the final winding, the guide either continues to approach the winding and continues to add to this shape, building on the cylinder as end forms (Patent No. 2,828,092 FIG. 8), are is held in one plane, building the earlier described conical ends, or is retracted so as to straighten the conical lines toward a vertical to the axis. In the first instance, a winding can be given gradually closing ends as described in my Patent No. 2,828,092, FIG. 14, if the cylindrical shape is modified to allow it and the approach rate is accelerated. In the final instance, the end can be made vertical or, by accelerating the rate of retraction, they can be slanted or curved inwardly.

Unless such a winding is made extremely tight, it can be removed from the mandrel by releasing the paper or cloth cover and sliding both off together. The cover can then be reused. If desired, a very slightly tapered mandrel can be used and release will be easier, with or without the cover. Another method is to slit the cylindrical mandrel on an angle lengthwise from the top of one end to the bottom of the other. Pulling the two pieces slightly apart will then release the winding easily. If other similar windings are to be made, the piece, used for holding the original loop ends from sliding, can be replaced with a longer lasting piece of metal or plastic fitted to the spindle. This must be closable so that it can be removed from the axial hole of the coil.

If end forms are used with windings made by this method, they will be considerably simplified in shape since, for holding, they need enclose only simple cylinders. Obviously, they must be of a diameter that will not interfere with the reciprocations of the guide as it approaches the axis at the start.

One of the advantages of windings of this type is the speed with which an operator can make up packages of different cables and lengths ordered, from experience instead of figures, all on the same mandrel, by accelerating or decreasing speeds of approach and retraction and by judging the correct point at which to reverse the guide's approach.

Windings made by this method have great stability. The early turns are usually at an angle nearer to the normal to the axis than the angle of later loops, rather than the usual opposite, and, being held within a cavity as deep as half the diameter of their own line, they oppose their spring against any slight closure that would allow their falling into the axial hole to initiate gradual loosening when subjected to vibration and shock. The later loops have the wrap-around and over-end holding that characterize the previously described windings.

Windings of this type can be used with the payout hole of my previous patents, being made with plus advance, minus advance, or plus/minus or they can pay out with twist from the center or over either end. They are well suited to being compressed endwise for conservation of space and to gain even greater stability, in which case outside enclosure and inside payout are recommended.

One winding made by this method, for a polyethylene covered cable of .050" diam. starts with a plus advance long enough to allow consecutive loops under relatively light tension to cross over without humping on a one inch diameter cylindrical mandrel, about 40 loops forming a layer. The guide is set at 1.938" from the axis with a stroke measuring 2.719" and the first loops fall .875" apart, several turns of paper being used between them to prevent their sliding inward.

At the start, the jack is actuated once for each loop, causing the guide to move inward (all measurements are approximately .010" per step).

When 35 feet have been wound, the guide is .953" from the axis, having wound 96 loops and the width has increased to 2".

At this point the jack is reversed to cause retraction of the guide and the rate of one action of the jack for each loop is maintained until 43 feet (115 loops) have been wound and the guide is at 1.094" from the axis. At this point, the rate of the guide's jacking is stepped up to 3 actions per loop and continued until 48 feet (126 loops) have been wound and the guide's distance has become 1.3125. The rate of 1 jacking per loop is then resumed and held until 50 feet (132 loops) and guide distance 1.359" have been attained. The jacking is then turned off while the last 10 feet, to total 60 feet, are wound. A small piece of adhesive tape is applied to the winding to prevent loosening of the coils; it is slid off the mandrel; and its paper case is removed for reuse.

A square ended coil, with the decreasing diameter of the end contours results. Without having had high tension on the line while being wound, it has great stability. To save space in use and to allow it to offer even greater resistance to falling apart caused by vibration and shock in storage and use, it is compressed endwise when being fitted into its cavity in a sonobuoy, decreasing from about 2.1205" in width to 1.75". It could be compressed more if desired.

The same coil could be modified by being made by a minus advance and could be made with the radial hole in plus or minus of Patent No. 2,767,938 or by the plus/minus of my Patent No. 2,634,922, in which case it could pay out through the side or it could be mounted horizontally to pay out in the direction of the movement of the cable.

It is interesting to note that, using a normal constant velocity cam and with the spherical areas correctly placed in accordance with this method, the line, which is formed on the spherical portion of a mandrel, or on a winding of this method, by a guide working on the surface of the mandrel, follows a great circle course and lies on the sphere for 180°; while the line, which is formed by a guide working approximately half of the distance from the guide to the axis away from the surface, follows a small circle course and lies on the sphere for considerably more than 180°. In the first instance, a maximum stage condition, the line has minimum grip and endwise enclosure (while the guide has maximum control of the winding area of the line). In the second, a basic stage condition, the line has greatly increased grip and enclosure (while the direct influence of the guide on the winding area is greatly reduced). When thought of as being hinged at the entrance and exit points of the sphere, the loop formed by the first line can be seen to be insecure in that paths on either side of the perfect line position are shorter than the perfect line. The second, considered in the same way, is shorter than paths on either side of it. When a loop of this nature is supported at its apex by a structure, as when winding on a mandrel, or by the spring of one loop after another beneath it, it has greatly increased gripping and enclosing power even when wound with low tension on the line.

This specific structure is very important in the general field of wound structures. For instance, in patent No. 2,837,456, June 3, 1958, of Arthur R. Parilla, starting with line 19, column 5, a weakness is reported in this area of a filament wound container which could be greatly improved and probably overcome by changing the winding from the great circle line type to the small circle type described above. Also, the importance of the end form shape, and of being able to determine it, becomes apparent here for, if the inner edge of the rim 14 of the end cap 11 were changed to the correct end form curve, the filaments in layers 20, in large part could become direct continuations of filaments from the body 12 and in any case would have much more effective and united closure force on flange 13.

Both would also provide improvement in structure and strength in the pressure vessel of Patent No. 2,848,133 of E. M. Ramberg which, according to his description, column 6, line 15, are actually random wound, that is, out of direct relation to the angle of the wound helix. Although he states "so that slipping is minimixed," the contrary would be true and the basic stage type of enclosure would add strength while decreasing wound volume. To accomplish the correct windings of the ends of the different angled helixes, either different lengths of stroke of the guide or, more efficiently and in the teaching of this patent, varying distances of the guide from the axis would be required for each helix. FIG. 19 shows a pressure vessel where the fibrous material is wound according to the present invention, with each end 201 formed of portions of figure 8 bights which extend for more than 180° around a spherical path.

While I have described herein some embodiments of my invention, I wish it to be understood that I do not intend to limit myself thereby except within the scope of the claims hereto or hereinafter appended.

I claim:

1. A package of flexible material wound in a series of figure 8's in which the crossovers of successive figure 8's are angularly displaced around the package, said package having an internal surface defining an axial opening therethrough, said surface having a cylindrical central portion, a portion of decreasing diameter at each end of said central portion, and end portions flaring outwardly at an angle to the axis of the package, the inner walls of the end portions being curved about centers located outside of the package and adjacent the central transverse plane thereof.

2. A package of flexible material wound in a series of figure 8's in which the crossovers of successive figure 8's are angularly displaced around the package, said package having an internal surface defining an axial opening therethrough, said surface having a cylindrical central portion, a spherical portion of decreasing diameter at each end of said central portion, and end portions flaring outwardly at an angle to the axis of the package, the inner walls of the end portions being curved about centers located outside of the package and adjacent the central transverse plane thereof.

3. A package of flexible material comprising a plurality of superposed layers each formed of a series of figure 8's in which the crossovers of successive figure 8's are angularly displaced around the package, said package having an internal surface defining an axial opening therethrough, said surface having a cylindrical central portion, at least some layers outwardly from the innermost layer having spherical portions of decreased diameter compared to the central portion of the layer, the path of the part of each such figure 8 around the spherical portions encompassing more than 180° of the spherical portion.

4. A package as claimed in claim 3 in which the crossing points in successive layers are spaced further apart at at least one point more than at most other points and at the same angular position in each layer to provide a radial opening into the axial opening through which the inner end of the material can be drawn out.

5. A machine for winding flexible material comprising a spindle, means to rotate said spindle, a guide, and means to move the guide back and forth along the spindle, the spindle having a central cylindrical portion, a portion of decreasing diameter at each end of such central portion, and outwardly flared end forms, the walls of said end forms being curved about centers located outside the spindle and adjacent the central transverse plane thereof.

6. A machine for winding flexible material comprising a spindle, a guide for flexible material, and means to cause such relative movement between the guide and spindle as to lay up on the spindle a series of figure 8's with their crossovers progressing angularly around the spindle, the spindle having a central cylindrical portion, a spherical portion of decreasing diameter at each end of such central portion, and outwardly flared end forms, the walls of said end forms being curved about centers located outside the spindle and adjacent the central transverse plane thereof.

7. A spindle for winding machines having a central cylindrical portion, a portion of decreasing diameter at each end of such central portion, and outwardly flared end forms, the walls of said end forms being curved about centers located outside the spindle and adjacent the central transverse plane thereof.

References Cited in the file of this patent

UNITED STATES PATENTS

| | | |
|---|---|---|
| 1,592,432 | Barry | July 13, 1926 |
| 2,828,092 | Taylor | Mar. 25, 1958 |

FOREIGN PATENTS

| | | |
|---|---|---|
| 18,394 | Great Britain | of 1889 |